US012679235B2

(12) United States Patent
Zeng et al.

(10) Patent No.: US 12,679,235 B2
(45) Date of Patent: Jul. 14, 2026

(54) WIRELESS CHARGING RECEIVER, TRANSMITTER, SYSTEM, AND CONTROL METHOD, AND ELECTRIC VEHICLE

(71) Applicant: HUAWEI TECHNOLOGIES CO., LTD., Shenzhen (CN)

(72) Inventors: Xiaosheng Zeng, Dongguan (CN); Hongcheng You, Shenzhen (CN); Yunhe Mao, Shenzhen (CN); Zhixian Wu, Dongguan (CN); Shuangquan Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 720 days.

(21) Appl. No.: 17/990,649

(22) Filed: Nov. 18, 2022

(65) Prior Publication Data

US 2023/0081974 A1     Mar. 16, 2023

Related U.S. Application Data

(63) Continuation of application No. PCT/CN2021/070617, filed on Jan. 7, 2021.

(30) Foreign Application Priority Data

May 19, 2020     (CN) .......................... 202010424440.5

(51) Int. Cl.
*H02J 7/00*          (2026.01)
*B60L 53/126*        (2019.01)
(Continued)

(52) U.S. Cl.
CPC ............. *B60L 53/38* (2019.02); *B60L 53/126* (2019.02); *B60L 53/36* (2019.02); *H02J 7/40* (2026.01);
(Continued)

(58) Field of Classification Search
CPC ........ B60L 53/38; B60L 53/126; B60L 53/36; H02J 50/12; H02J 50/80; H02J 50/90; H02J 7/00032
(Continued)

(56) References Cited

U.S. PATENT DOCUMENTS 10,023,059 B2     7/2018  Roehrl et al.
2016/0329748 A1*  11/2016  White, II .............. H01F 27/366
(Continued)

FOREIGN PATENT DOCUMENTS

CN        105305578 A      2/2016
CN        107054108 A      8/2017
(Continued)

*Primary Examiner* — Zixuan Zhou
(74) *Attorney, Agent, or Firm* — Leydig, Voit & Mayer, Ltd.

(57)          ABSTRACT

A wireless charging receiver, transmitter, system, and control method, and an electric vehicle are provided, which relate to the field of wireless charging technologies. A low-frequency magnetic field receive coil of the receiver converts a low-frequency magnetic field into an induced signal. A receiver controller is configured to: when all low-frequency magnetic field transmit coils stop working, allocate a signal feature different from that of a current induced signal to each low-frequency magnetic field transmit coil, and send a correspondence between each low-frequency magnetic field transmit coil and the allocated signal feature to the wireless charging transmitter; and is further configured to determine, when the low-frequency magnetic field transmit coil works, relative positions of the power transmit coil and the power receive coil by using an induced signal having the allocated signal feature.

19 Claims, 12 Drawing Sheets

S901

Allocate, when all low-frequency magnetic field transmit coils stop working, a signal feature different from that of a currently obtained induced signal to each low-frequency magnetic field transmit coil, and send a correspondence between each low-frequency magnetic field transmit coil and the allocated signal feature to a wireless charging transmitter

S902

Determine, when the low-frequency magnetic field transmit coil works, relative positions of a power transmit coil and a power receive coil by using an induced signal having the allocated signal feature

(51) Int. Cl.

| | | |
|---|---|---|
| *B60L 53/36* | (2019.01) | |
| *B60L 53/38* | (2019.01) | |
| *H02J 7/40* | (2026.01) | |
| *H02J 50/12* | (2016.01) | |
| *H02J 50/80* | (2016.01) | |
| *H02J 50/90* | (2016.01) | |

(52) U.S. Cl.
CPC .............. *H02J 50/12* (2016.02); *H02J 50/80* (2016.02); *H02J 50/90* (2016.02)

(58) Field of Classification Search
USPC ............................. 701/22; 320/108; 307/104
See application file for complete search history.

(56) References Cited

U.S. PATENT DOCUMENTS

| | | |
|---|---|---|
| 2017/0111088 A1 | 4/2017 | Seong et al. |
| 2018/0241258 A1 | 8/2018 | Seong |
| 2019/0023141 A1* | 1/2019 | Huang .................. B60L 53/122 |
| 2019/0255965 A1 | 8/2019 | Hocke et al. |

FOREIGN PATENT DOCUMENTS

| | | |
|---|---|---|
| CN | 107124047 A | 9/2017 |
| CN | 108462262 A | 8/2018 |
| CN | 109733216 A | 5/2019 |
| CN | 111731139 A | 10/2020 |
| JP | 2016535577 A | 11/2016 |
| JP | 2017518012 A | 6/2017 |
| WO | 2012111127 A1 | 8/2012 |

* cited by examiner

100

Ground

Wireless charging receiver
101

Non-contact charging

Wireless charging
transmitter 201

200

Ltx

Lrx

Parking space A                    Parking space B

Vehicle a                          Vehicle b

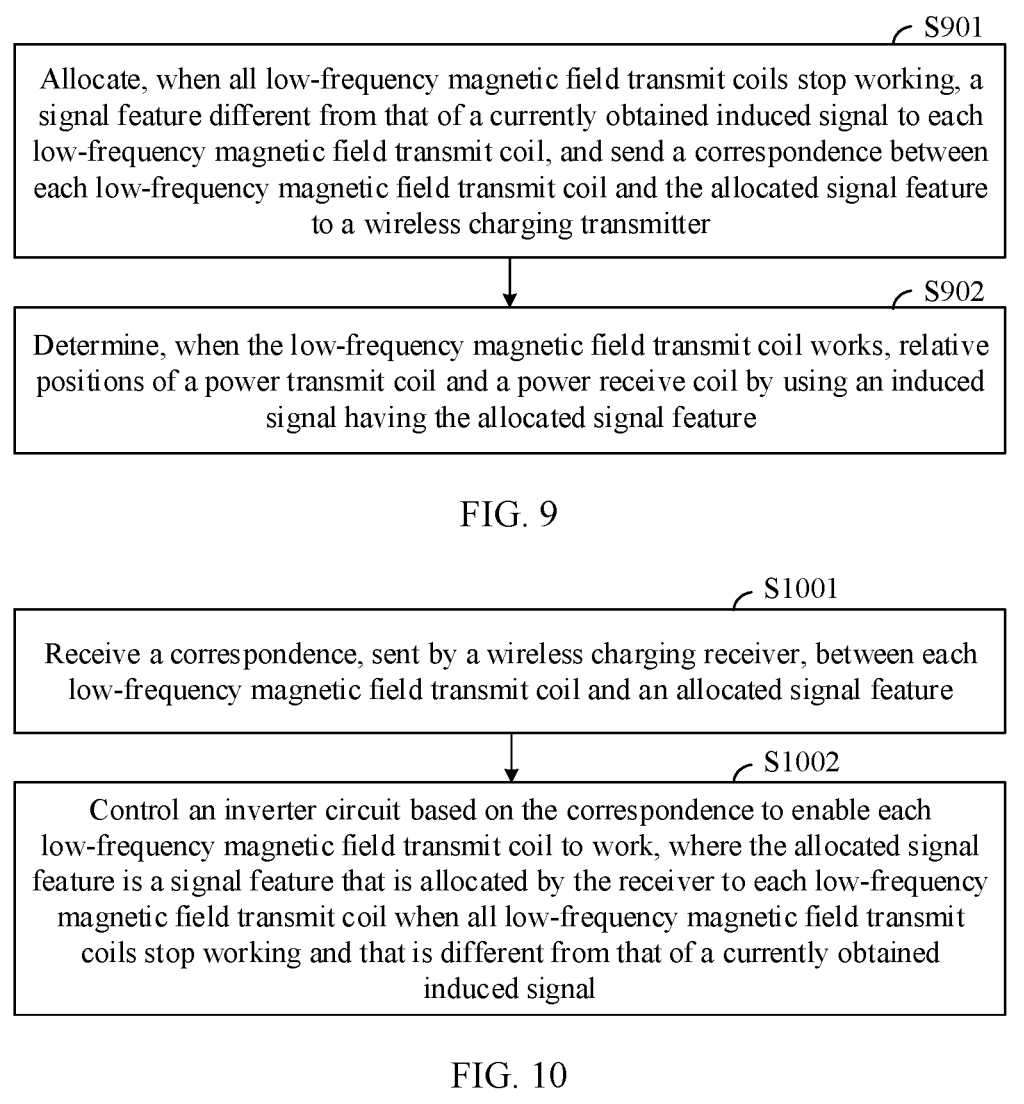

S901

Allocate, when all low-frequency magnetic field transmit coils stop working, a signal feature different from that of a currently obtained induced signal to each low-frequency magnetic field transmit coil, and send a correspondence between each low-frequency magnetic field transmit coil and the allocated signal feature to a wireless charging transmitter

S902

Determine, when the low-frequency magnetic field transmit coil works, relative positions of a power transmit coil and a power receive coil by using an induced signal having the allocated signal feature

Receive a correspondence, sent by a wireless charging receiver, between each low-frequency magnetic field transmit coil and an allocated signal feature

S1002

Control an inverter circuit based on the correspondence to enable each low-frequency magnetic field transmit coil to work, where the allocated signal feature is a signal feature that is allocated by the receiver to each low-frequency magnetic field transmit coil when all low-frequency magnetic field transmit coils stop working and that is different from that of a currently obtained induced signal

FIG. 10

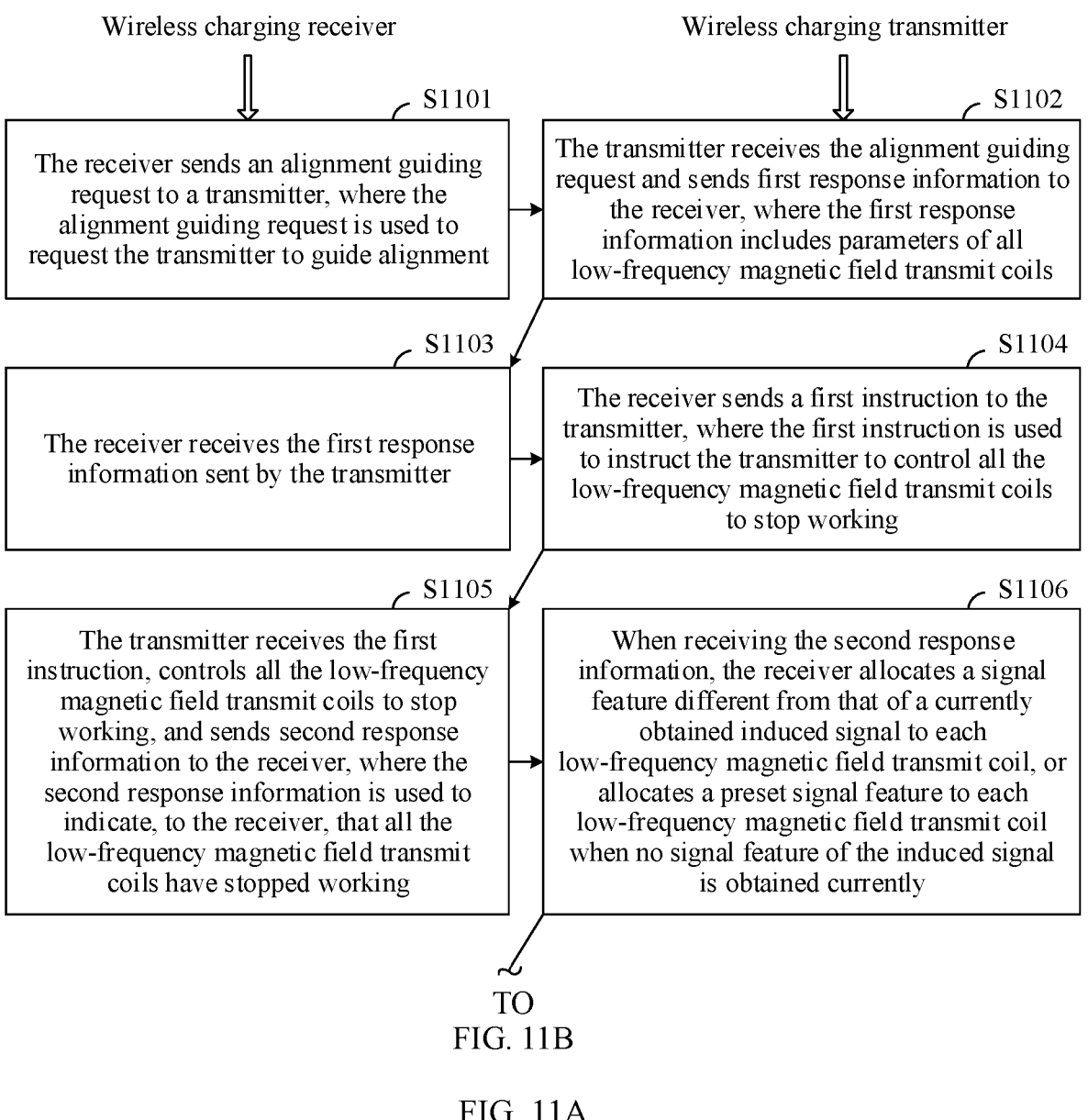

Wireless charging receiver

Wireless charging transmitter

S1101

The receiver sends an alignment guiding request to a transmitter, where the alignment guiding request is used to request the transmitter to guide alignment

S1102

The transmitter receives the alignment guiding request and sends first response information to the receiver, where the first response information includes parameters of all low-frequency magnetic field transmit coils

S1103

The receiver receives the first response information sent by the transmitter

S1104

The receiver sends a first instruction to the transmitter, where the first instruction is used to instruct the transmitter to control all the low-frequency magnetic field transmit coils to stop working

S1105

The transmitter receives the first instruction, controls all the low-frequency magnetic field transmit coils to stop working, and sends second response information to the receiver, where the second response information is used to indicate, to the receiver, that all the low-frequency magnetic field transmit coils have stopped working

S1106

When receiving the second response information, the receiver allocates a signal feature different from that of a currently obtained induced signal to each low-frequency magnetic field transmit coil, or allocates a preset signal feature to each low-frequency magnetic field transmit coil when no signal feature of the induced signal is obtained currently

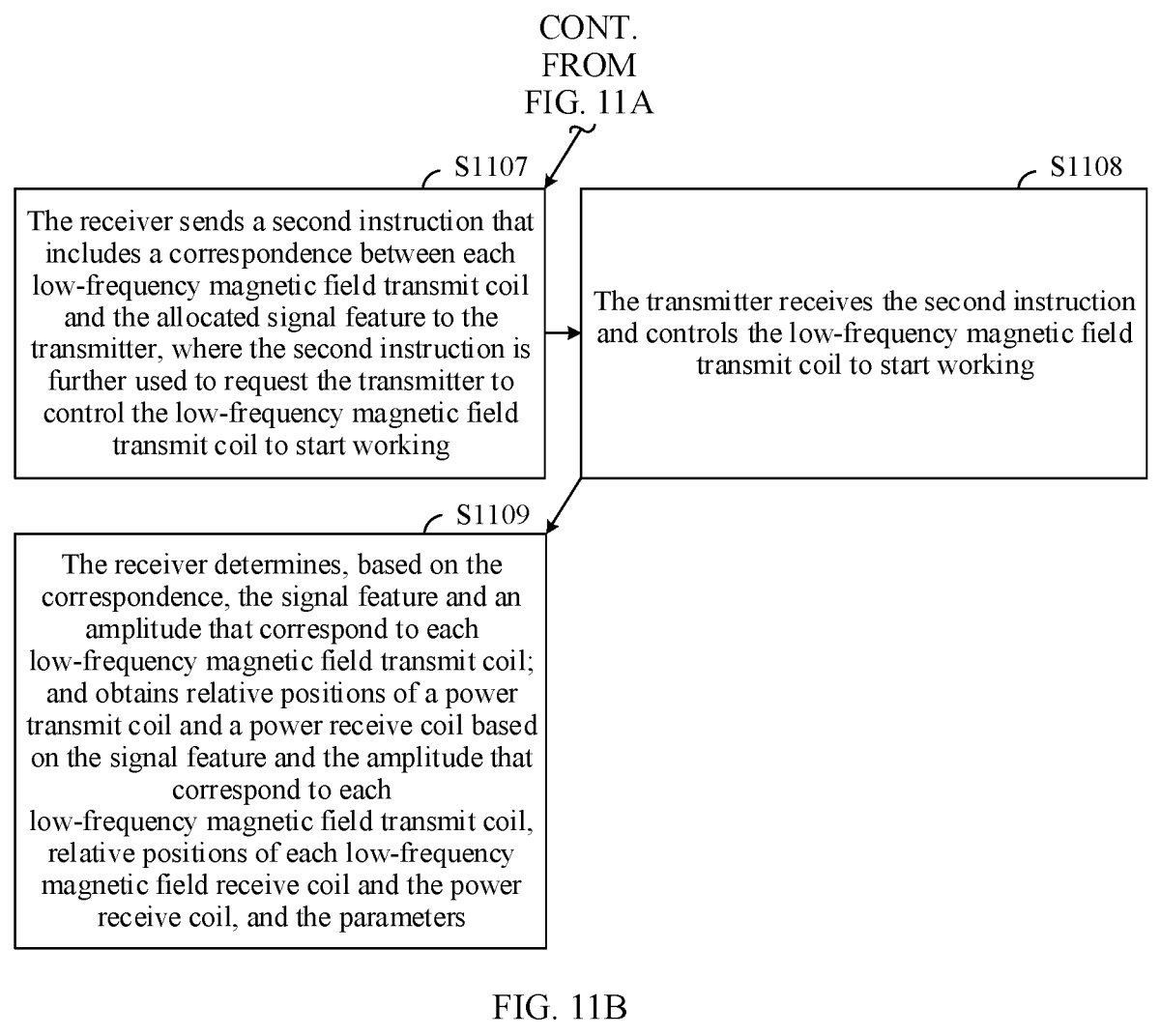

CONT.
FROM
FIG. 11A

S1107

The receiver sends a second instruction that includes a correspondence between each low-frequency magnetic field transmit coil and the allocated signal feature to the transmitter, where the second instruction is further used to request the transmitter to control the low-frequency magnetic field transmit coil to start working

S1108

The transmitter receives the second instruction and controls the low-frequency magnetic field transmit coil to start working

S1109

The receiver determines, based on the correspondence, the signal feature and an amplitude that correspond to each low-frequency magnetic field transmit coil; and obtains relative positions of a power transmit coil and a power receive coil based on the signal feature and the amplitude that correspond to each low-frequency magnetic field transmit coil, relative positions of each low-frequency magnetic field receive coil and the power receive coil, and the parameters

Wireless charging receiver
101

WIRELESS CHARGING RECEIVER, TRANSMITTER, SYSTEM, AND CONTROL METHOD, AND ELECTRIC VEHICLE

CROSS-REFERENCE TO RELATED APPLICATIONS

This application is a continuation of International Application No. PCT/CN2021/070617, filed on Jan. 7, 2021, which claims priority to Chinese Patent Application No. 202010424440.5, filed on May 19, 2020. The disclosures of the aforementioned applications are hereby incorporated by reference in their entireties.

TECHNICAL FIELD

Embodiments of this application relate to the field of wireless charging technologies, and in particular, to a wireless charging receiver, transmitter, system, and control method, and an electric vehicle.

BACKGROUND

With the intensification of energy shortage and environmental pollution problems in modern society, electric vehicles have attracted wide attention from various circles as new energy vehicles. An electric vehicle uses a vehicle-mounted power battery pack as an energy source to drive the vehicle to run. Currently, charging manners of electric vehicles include contact charging and wireless charging. The wireless charging manner becomes a future development direction of electric vehicles by virtue of advantages such as user-friendliness, no spark or electric shock hazard, no mechanical wear, and adaptability to diverse harsh environments and weathers.

A wireless charging system includes a wireless charging transmitter (referred to as a transmitter below) and a wireless charging receiver (referred to as a receiver below). Usually, the transmitter is located on the ground, and the receiver is located on an electric vehicle. During wireless charging of the electric vehicle, whether a power transmit coil of the transmitter is aligned with a power receive coil of the receiver directly affects wireless charging power and wireless charging efficiency.

To align the power transmit coil with the power receive coil, a low-frequency magnetic field transmit coil may be added to the transmitter, and the low-frequency magnetic field transmit coil is driven by an internal circuit of the transmitter to generate a low-frequency alternating magnetic field; and a low-frequency magnetic field receive coil is added to the receiver, and the low-frequency magnetic field receive coil generates an induced signal (induced voltage or induced current) in the low-frequency alternating magnetic field. An amplitude of the induced signal is related to a position, and position information of the power transmit coil and the power receive coil is obtained by detecting the amplitude of the induced signal. However, when an operation of aligning a power transmit coil with a power receive coil is also performed in an adjacent parking space, a low-frequency alternating magnetic field generated by a transmitter of the adjacent parking space causes interference to the low-frequency alternating magnetic field generated by the transmitter of a local parking space, and consequently affects the amplitude of the induced signal obtained by the receiver of the local parking space. As a result, the obtained position information is inaccurate, which leads to misalignment of the power transmit coil and the power receive coil.

SUMMARY

To resolve the foregoing technical problem, this application provides a wireless charging receiver, transmitter, system, and control method, and an electric vehicle, so as to avoid interference between low-frequency magnetic field signals of adjacent parking spaces, so that obtained relative positions of a power transmit coil and a power receive coil are more accurate.

According to a first aspect, this application provides a wireless charging receiver. The receiver includes a receiver controller, a power receive coil, and a low-frequency magnetic field receive coil. The power receive coil is configured to convert an alternating magnetic field transmitted by a power transmit coil into alternating current. The low-frequency magnetic field receive coil converts a low-frequency magnetic field into an induced signal. In actual application, the low-frequency magnetic field received by the low-frequency magnetic field receive coil may include an interfering magnetic field transmitted by another transmitter, and therefore the obtained induced signal may further include an interfering signal. The receiver controller is configured to: when all low-frequency magnetic field transmit coils stop working, allocate a signal feature different from that of a current induced signal to each low-frequency magnetic field transmit coil, in which case the induced signal obtained by the low-frequency magnetic field receive coil is an interfering signal, that is, allocate a signal feature different from that of the currently existing interfering signal to each low-frequency magnetic field transmit coil; and send a correspondence between each low-frequency magnetic field transmit coil and the allocated signal feature to a wireless charging transmitter. The receiver controller is further configured to determine, when the low-frequency magnetic field transmit coil works, relative positions of the power transmit coil and the power receive coil by using an induced signal having the allocated signal feature.

An induced signal without an allocated signal pulse width is an interfering signal, and is not used to determine the relative positions of the power transmit coil and the power receive coil. Therefore, interference between low-frequency magnetic field signals of adjacent parking spaces can be avoided, so that the obtained relative positions of the power transmit coil and the power receive coil are more accurate.

With reference to the first aspect, in a first possible implementation, when all the low-frequency magnetic field transmit coils stop working and no signal feature is obtained, that is, no interfering magnetic field is present and no interfering signal is obtained on the low-frequency magnetic field receive coil, the signal feature allocated by the receiver controller to each low-frequency magnetic field transmit coil is a preset signal feature.

With reference to the first aspect, in a second possible implementation, the receiver controller is further configured to send an alignment guiding request to the transmitter, where the alignment guiding request is used to request the transmitter to guide alignment. The receiver controller can further receive first response information sent by the transmitter, where the first response information includes parameters of all the low-frequency magnetic field transmit coils. The parameters are used to calculate the relative positions of the power transmit coil and the power receive coil.

With reference to the first aspect, in a third possible implementation, the receiver controller further sends a first instruction to the transmitter, where the first instruction is used to instruct the transmitter to control all the low-frequency magnetic field transmit coils to stop working, so that the transmitter detects whether there is an interfering signal currently, and when there is an interfering signal, determines a signal feature of the interfering signal. The receiver controller is further configured to: when second response information sent by the transmitter is received, allocate the signal feature different from that of the currently obtained induced signal, namely, the current interfering signal, to each low-frequency magnetic field transmit coil. The second response information is used to indicate, to the receiver, that all the low-frequency magnetic field transmit coils have stopped working.

With reference to the first aspect, in a fourth possible implementation, the receiver controller further sends a second instruction that includes the correspondence between each low-frequency magnetic field transmit coil and the allocated signal feature to the transmitter. The second instruction is used to inform the transmitter of the correspondence. The second instruction is further used to request the transmitter to control the low-frequency magnetic field transmit coil to start working.

With reference to the first aspect, in a fifth possible implementation, the parameters include identification information of the low-frequency magnetic field transmit coil, size information, and relative position information of the low-frequency magnetic field transmit coil and the power transmit coil. The identification information is used to distinguish each low-frequency magnetic field transmit coil. The size information is used to determine relative positions of the low-frequency magnetic field transmit coil and the low-frequency magnetic field receive coil. The relative position information needs to be used when converting the relative positions of the low-frequency magnetic field transmit coil and the low-frequency magnetic field receive coil into the relative positions of the power transmit coil and the power receive coil.

With reference to the first aspect, in a sixth possible implementation, when specifically obtaining the relative positions of the power transmit coil and the power receive coil, the receiver controller first determines, based on the correspondence, the signal feature and an amplitude that correspond to each low-frequency magnetic field transmit coil, and then obtains the relative positions of the power transmit coil and the power receive coil based on the signal feature and the amplitude that correspond to each low-frequency magnetic field transmit coil, relative positions of each low-frequency magnetic field receive coil and the power receive coil, and the parameters.

With reference to the first aspect, in a seventh possible implementation, the signal feature may be a signal pulse width, a signal code, and a signal frequency.

With reference to the first aspect, in an eighth possible implementation, the wireless charging receiver further includes a detection circuit. An input terminal of the detection circuit is connected to the low-frequency magnetic field receive coil, and an output terminal of the detection circuit is connected to the receiver controller, to obtain an amplitude of the induced signal and the signal feature of the induced signal and send the amplitude and the signal feature to the receiver controller. There may be one or more detection circuits. In some embodiments, a quantity of detection circuits may be the same as a quantity of low-frequency magnetic field receive coils, and the detection circuits are connected to the low-frequency magnetic field receive coils in a one-to-one correspondence.

With reference to the first aspect, in a ninth possible implementation, the receiver further includes a receiver capacitor, and each low-frequency magnetic field receive coil is connected in parallel to one receiver capacitor. The receiver capacitor and the low-frequency magnetic field receive coil form a parallel resonant circuit, so as to enhance the induced signal obtained through conversion by the low-frequency magnetic field receive coil.

With reference to the first aspect, in a tenth possible implementation, the signal feature is the signal pulse width. In this case, the detection circuit detects pulse duration of the induced signal to obtain the signal pulse width of the induced signal.

With reference to the first aspect, in an eleventh possible implementation, the signal feature is the signal code. In this case, the detection circuit obtains the signal code based on duration of the induced signal or an interruption time of the induced signal.

With reference to the first aspect, in a twelfth possible implementation, the signal feature is the signal frequency. In this case, each low-frequency magnetic field receive coil is connected in parallel to at least two frequency adjustment branches, and each frequency adjustment branch includes a receiver capacitor and a switch that are connected in series. The receiver controller controls a working status of the switch in each frequency adjustment branch, so that a parallel resonance frequency of the low-frequency magnetic field receive coil and the connected receiver capacitor is the same as the allocated signal frequency, thereby enhancing the induced signal having the allocated signal frequency.

With reference to the first aspect, in a thirteenth possible implementation, the wireless charging receiver includes at least two low-frequency magnetic field receive coils. In some embodiments, the wireless charging receiver may alternatively include only one low-frequency magnetic field receive coil. In this case, to obtain a distance between the power transmit coil and the power receive coil, the wireless charging transmitter needs to include at least two low-frequency magnetic field transmit coils. Therefore, on the premise that a quantity of low-frequency magnetic field transmit coils of the wireless charging transmitter is unknown, the receiver includes at least two low-frequency magnetic field receive coils to obtain the distance.

According to a second aspect, this application further provides a wireless charging transmitter. The transmitter includes an inverter circuit, a transmitter controller, a power transmit coil, and a low-frequency magnetic field transmit coil. The power transmit coil is configured to transmit alternating current in a form of an alternating magnetic field. The inverter circuit is configured to convert direct current into alternating current and then transmit the alternating current to the low-frequency magnetic field transmit coil. The low-frequency magnetic field transmit coil is configured to transmit the alternating current in a form of a low-frequency magnetic field. The transmitter controller receives a correspondence, sent by a wireless charging receiver, between each low-frequency magnetic field transmit coil and an allocated signal feature, and is further configured to control the inverter circuit based on the correspondence to enable each low-frequency magnetic field transmit coil to work. The allocated signal feature is a signal feature that is allocated by a receiver controller to each low-frequency magnetic field transmit coil when all low-frequency magnetic field transmit coils stop working and that is different from that of a current induced signal, in other words, is a signal feature different from that of an interfering signal.

With reference to the second aspect, in a first possible implementation, when all the low-frequency magnetic field transmit coils stop working and the receiver controller obtains no signal feature, that is, no interfering magnetic field is present and a low-frequency magnetic field receive coil generates no induced current, the allocated signal feature is a preset signal feature allocated to each low-frequency magnetic field transmit coil.

With reference to the second aspect, in a second possible implementation, the transmitter controller receives an alignment guiding request sent by the receiver, where the alignment guiding request is used to request the transmitter to guide alignment. The transmitter controller is further configured to send first response information to the receiver, where the first response information includes parameters of all the low-frequency magnetic field transmit coils. The parameter information is used to subsequently determine relative positions of the power transmit coil and a power receive coil.

With reference to the second aspect, in a third possible implementation, the transmitter controller is further configured to receive a first instruction sent by the receiver, where the first instruction is used to instruct the transmitter to control all the low-frequency magnetic field transmit coils to stop working, so that the receiver detects whether there is an interfering magnetic field currently. The transmitter controller is further configured to send second response information to the receiver, where the second response information is used to indicate, to the receiver, that all the low-frequency magnetic field transmit coils have stopped working.

With reference to the second aspect, in a fourth possible implementation, the transmitter controller can receive a second instruction that is sent by the receiver and that includes the correspondence between each low-frequency magnetic field transmit coil and the allocated signal feature. The second instruction is further used to request the transmitter to control the low-frequency magnetic field transmit coil to start working.

With reference to the second aspect, in a fifth possible implementation, the parameters include identification information of the low-frequency magnetic field transmit coil, size information, and relative position information of the low-frequency magnetic field transmit coil and the power transmit coil.

With reference to the second aspect, in a sixth possible implementation, the signal feature may be a signal pulse width, a signal code, and a signal frequency:

With reference to the second aspect, in a seventh possible implementation, the transmitter further includes a transmitter capacitor. Each low-frequency magnetic field transmit coil is connected in series to one transmitter capacitor. The transmitter capacitor is configured to form a series resonant circuit jointly with the low-frequency magnetic field transmit coil, to enhance a low-frequency magnetic field.

With reference to the second aspect, in an eighth possible implementation, the signal feature is the signal pulse width. In this case, the transmitter controller adjusts a duty cycle and/or a frequency of a control signal of a switching transistor in the inverter circuit based on the correspondence, so that the low-frequency magnetic field transmit coils transmit low-frequency magnetic fields at different times. The low-frequency magnetic field is used to make each low-frequency magnetic field receive coil generate an induced signal having the allocated signal pulse width.

With reference to the second aspect, in a ninth possible implementation, the signal feature is the signal code. In this case, the transmitter controller adjusts a control signal of a switching transistor in the inverter circuit based on the correspondence, so that the low-frequency magnetic field transmit coil transmits a low-frequency magnetic field based on preset duration or stops working based on a preset interruption time.

With reference to the second aspect, in a tenth possible implementation, a signal encoding manner is binary encoding. In this case, the transmitter controller controls the low-frequency magnetic field transmit coil to stop for a preset time after transmitting each low-frequency magnetic field corresponding to one binary digit and then transmit a low-frequency magnetic field corresponding to a next binary digit.

With reference to the second aspect, in an eleventh possible implementation, the signal feature is the signal frequency, and each low-frequency magnetic field transmit coil is connected in series to one frequency adjustment circuit, where each frequency adjustment circuit includes at least two frequency adjustment branches connected in parallel, and each frequency adjustment branch includes a transmitter capacitor and a switch that are connected in series. The transmitter controller controls a working status of the switch in each frequency adjustment branch based on the correspondence, so that a series resonance frequency of the low-frequency magnetic field transmit coil and the connected transmitter capacitor is the same as the signal frequency allocated to the low-frequency magnetic field transmit coil. The transmitter controller is further configured to adjust a duty cycle and/or a frequency of a control signal of a switching transistor in the inverter circuit, so that each low-frequency magnetic field transmit coil transmits the low-frequency magnetic field.

With reference to the second aspect, in a twelfth possible implementation, the wireless charging transmitter includes at least two low-frequency magnetic field transmit coils.

According to a third aspect, this application further provides a wireless charging control method, applied to the foregoing wireless charging receiver. The method includes: allocating, when all low-frequency magnetic field transmit coils stop working, a signal feature different from that of a currently obtained induced signal to each low-frequency magnetic field transmit coil, and sending a correspondence between each low-frequency magnetic field transmit coil and the allocated signal feature to a wireless charging transmitter; and determining, when the low-frequency magnetic field transmit coil works, relative positions of a power transmit coil and a power receive coil by using an induced signal having the allocated signal feature.

According to the method, an induced signal without the allocated signal feature, namely, an interfering signal, is not used to determine the relative positions. Therefore, interference between low-frequency magnetic field signals of adjacent parking spaces can be avoided, so that the obtained relative positions of the power transmit coil and the power receive coil are more accurate.

With reference to the third aspect, in a first possible implementation, the method further includes: when all the low-frequency magnetic field transmit coils stop working and no signal feature is obtained, the signal feature allocated to each low-frequency magnetic field transmit coil is a preset signal feature.

With reference to the third aspect, in a second possible implementation, the method further includes: sending an alignment guiding request to the transmitter, where the alignment guiding request is used to request the transmitter to guide alignment; and receiving first response information sent by the transmitter, where the first response information includes parameters of all the low-frequency magnetic field transmit coils.

With reference to the third aspect, in a third possible implementation, the allocating, when all low-frequency magnetic field transmit coils stop working, a signal feature different from that of a currently obtained induced signal to each low-frequency magnetic field transmit coil specifically includes: sending a first instruction to the transmitter, where the first instruction is used to instruct the transmitter to control all the low-frequency magnetic field transmit coils to stop working; and when second response information sent by the transmitter is received, allocating the signal feature different from that of the currently obtained induced signal to each low-frequency magnetic field transmit coil, where the second response information is used to indicate, to the receiver, that all the low-frequency magnetic field transmit coils have stopped working.

With reference to the third aspect, in a fourth possible implementation, the sending a correspondence between each low-frequency magnetic field transmit coil and the allocated signal feature to a wireless charging transmitter specifically includes: sending a second instruction that includes the correspondence between each low-frequency magnetic field transmit coil and the allocated signal feature to the transmitter, where the second instruction is further used to request the transmitter to control the low-frequency magnetic field transmit coil to start working.

With reference to the third aspect, in a fifth possible implementation, the parameters include identification information of the low-frequency magnetic field transmit coil, size information, and relative position information of the low-frequency magnetic field transmit coil and the power transmit coil.

With reference to the third aspect, in a sixth possible implementation, the method further includes: determining, based on the correspondence, the signal feature and an amplitude that correspond to each low-frequency magnetic field transmit coil; and obtaining the relative positions of the power transmit coil and the power receive coil based on the signal feature and the amplitude that correspond to each low-frequency magnetic field transmit coil, relative positions of each low-frequency magnetic field receive coil and the power receive coil, and the parameters.

With reference to the third aspect, in a seventh possible implementation, the signal feature includes a signal pulse width, a signal code, and a signal frequency.

With reference to the third aspect, in an eighth possible implementation, the method further includes: obtaining the signal feature of the induced signal and an amplitude of the induced signal.

With reference to the third aspect, in a ninth possible implementation, the signal feature is the signal pulse width, and the obtaining the signal feature of the induced signal specifically includes: detecting pulse duration of the induced signal to obtain the signal pulse width of the induced signal.

With reference to the third aspect, in a tenth possible implementation, the signal feature is the signal code, and the obtaining the signal feature of the induced signal specifically includes: obtaining the signal code based on duration of the induced signal or an interruption time of the induced signal.

With reference to the third aspect, in an eleventh possible implementation, the signal feature is the signal frequency, and each low-frequency magnetic field receive coil is connected in parallel to at least two frequency adjustment branches, where each frequency adjustment branch includes a receiver capacitor and a switch that are connected in series.

The method further includes: controlling a working status of the switch in each frequency adjustment branch, so that a parallel resonance frequency of the low-frequency magnetic field receive coil and the connected receiver capacitor is the same as the allocated signal frequency.

According to a fourth aspect, this application further provides a wireless charging control method, applied to a wireless charging transmitter. The method includes:

receiving a correspondence, sent by a wireless charging receiver, between each low-frequency magnetic field transmit coil and an allocated signal feature; and controlling an inverter circuit based on the correspondence to enable each low-frequency magnetic field transmit coil to work, where the allocated signal feature is a signal feature that is allocated by the receiver to each low-frequency magnetic field transmit coil when all low-frequency magnetic field transmit coils stop working and that is different from that of a currently obtained induced signal.

With reference to the fourth aspect, in a first possible implementation, when all the low-frequency magnetic field transmit coils stop working and the receiver obtains no signal feature, the allocated signal feature is a preset signal feature allocated to each low-frequency magnetic field transmit coil.

With reference to the fourth aspect, in a second possible implementation, the method further includes: receiving an alignment guiding request sent by the receiver, where the alignment guiding request is used to request the transmitter to guide alignment; and sending first response information to the receiver, where the first response information includes parameters of all the low-frequency magnetic field transmit coils.

With reference to the fourth aspect, in a third possible implementation, the method further includes: receiving a first instruction sent by the receiver, where the first instruction is used to instruct the transmitter to control all the low-frequency magnetic field transmit coils to stop working; and sending second response information to the receiver, where the second response information is used to indicate, to the receiver, that all the low-frequency magnetic field transmit coils have stopped working.

With reference to the fourth aspect, in a fourth possible implementation, the receiving a correspondence, sent by a wireless charging receiver, between each low-frequency magnetic field transmit coil and an allocated signal feature specifically includes:

receiving a second instruction that is sent by the receiver and that includes the correspondence between each low-frequency magnetic field transmit coil and the allocated signal feature, where the second instruction is further used to request the transmitter to control the low-frequency magnetic field transmit coil to start working.

With reference to the fourth aspect, in a fifth possible implementation, the parameters include identification information of the low-frequency magnetic field transmit coil, size information, and relative position information of the low-frequency magnetic field transmit coil and a power transmit coil.

With reference to the fourth aspect, in a sixth possible implementation, the signal feature may be one of a signal pulse width, a signal code, and a signal frequency.

With reference to the fourth aspect, in a seventh possible implementation, the signal feature is the signal pulse width, and the controlling an inverter circuit based on the correspondence so that each low-frequency magnetic field transmit coil works specifically includes: adjusting a duty cycle and/or a frequency of a control signal of a switching transistor in the inverter circuit based on the correspondence, so that the low-frequency magnetic field transmit coils transmit low-frequency magnetic fields at different times, where the low-frequency magnetic field is used to make each low-frequency magnetic field receive coil generate an induced signal having the allocated signal pulse width.

With reference to the fourth aspect, in an eighth possible implementation, the signal feature is the signal code, and the controlling an inverter circuit based on the correspondence so that each low-frequency magnetic field transmit coil works specifically includes:

adjusting a control signal of a switching transistor in the inverter circuit based on the correspondence, so that the low-frequency magnetic field transmit coil transmits a low-frequency magnetic field based on preset duration or stops working based on a preset interruption time.

With reference to the fourth aspect, in a ninth possible implementation, a signal encoding manner is binary encoding, and the adjusting a control signal of a switching transistor in the inverter circuit based on the correspondence specifically includes: controlling the low-frequency magnetic field transmit coil to stop for a preset time after transmitting each low-frequency magnetic field corresponding to one binary digit and then transmit a low-frequency magnetic field corresponding to a next binary digit.

With reference to the fourth aspect, in a tenth possible implementation, the signal feature is the signal frequency, and each low-frequency magnetic field transmit coil is connected in series to one frequency adjustment circuit, where each frequency adjustment circuit includes at least two frequency adjustment branches connected in parallel, and each frequency adjustment branch includes a transmitter capacitor and a switch that are connected in series. The controlling an inverter circuit based on the correspondence so that each low-frequency magnetic field transmit coil works specifically includes: controlling a working status of the switch in each frequency adjustment branch based on the correspondence, so that a series resonance frequency of the low-frequency magnetic field transmit coil and the connected transmitter capacitor is the same as the signal frequency allocated to the low-frequency magnetic field transmit coil; and adjusting a duty cycle and/or a frequency of a control signal of a switching transistor in the inverter circuit, so that each low-frequency magnetic field transmit coil transmits the low-frequency magnetic field.

According to a fifth aspect, this application further provides a wireless charging system. The system includes the wireless charging receiver and the wireless charging transmitter provided in the foregoing implementations.

The wireless charging system can avoid interference from a low-frequency magnetic field signal of another wireless charging transmitter, so that obtained relative positions of a power transmit coil and a power receive coil are more accurate.

According to a sixth aspect, this application further provides an electric vehicle. The electric vehicle includes the wireless charging receiver provided in the foregoing implementations, and further includes a power battery pack. The power battery pack is configured to electrically connect to the receiver for charging by using electric energy from the receiver, and is also configured to provide electric energy for the electric vehicle.

With reference to the sixth aspect, in a first possible implementation, the electric vehicle further includes a display screen. The display screen is configured to display relative positions of a power transmit coil and a power receive coil, so as to guide a driver in coil calibration.

During parking of the electric vehicle, interference from a low-frequency magnetic field signal of an adjacent parking space can be avoided, so that the power transmit coil and the power receive coil can be aligned more accurately, thereby increasing charging power and charging efficiency during wireless charging.

The technical solutions provided in this application have at least the following advantages:

When all the low-frequency magnetic field transmit coils of the wireless charging transmitter stop working, a low-frequency magnetic field received by the low-frequency magnetic field receive coil is an interfering magnetic field, and an induced signal obtained through conversion is an interfering signal. The receiver controller allocates the signal feature different from that of the currently obtained induced signal to each low-frequency magnetic field transmit coil. In other words, the signal feature allocated to the low-frequency magnetic field transmit coil is different from that of the interfering signal. The receiver controller further sends the correspondence between each low-frequency magnetic field transmit coil and the allocated signal feature to the wireless charging transmitter. The transmitter controller receives the correspondence, and controls the inverter circuit based on the correspondence so that each low-frequency magnetic field transmit coil works. In this case, the receiver controller can determine the relative positions of the power transmit coil and the power receive coil by using the induced signal having the allocated signal feature, and the induced signal without the allocated signal feature is an interfering signal and is not used to determine the relative positions. Therefore, interference between low-frequency magnetic field signals of adjacent parking spaces can be avoided, so that the obtained relative positions of the power transmit coil and the power receive coil are more accurate.

BRIEF DESCRIPTION OF DRAWINGS

FIG. 9 is a flowchart of a wireless charging control method according to an embodiment of this application:

FIG. 10 is a flowchart of another wireless charging control method according to an embodiment of this application:

FIG. 11A and FIG. 11B are a flowchart of still another wireless charging control method according to an embodiment of this application;

DESCRIPTION OF EMBODIMENTS

To make a person skilled in the art better understand technical solutions provided in embodiments of this application, the following first describes an application scenario of a wireless charging system.

A wireless charging receiver provided in this application wirelessly induces, by using a receive coil, an alternating magnetic field sent by a transmitter, and converts the alternating magnetic field into direct current to charge a load. When the wireless charging receiver and the wireless charging transmitter are applied to the electric vehicle field, the transmitter may be located on the ground, the receiver may be located on an electric vehicle, and the load is a power battery pack of the electric vehicle.

Figure 1:
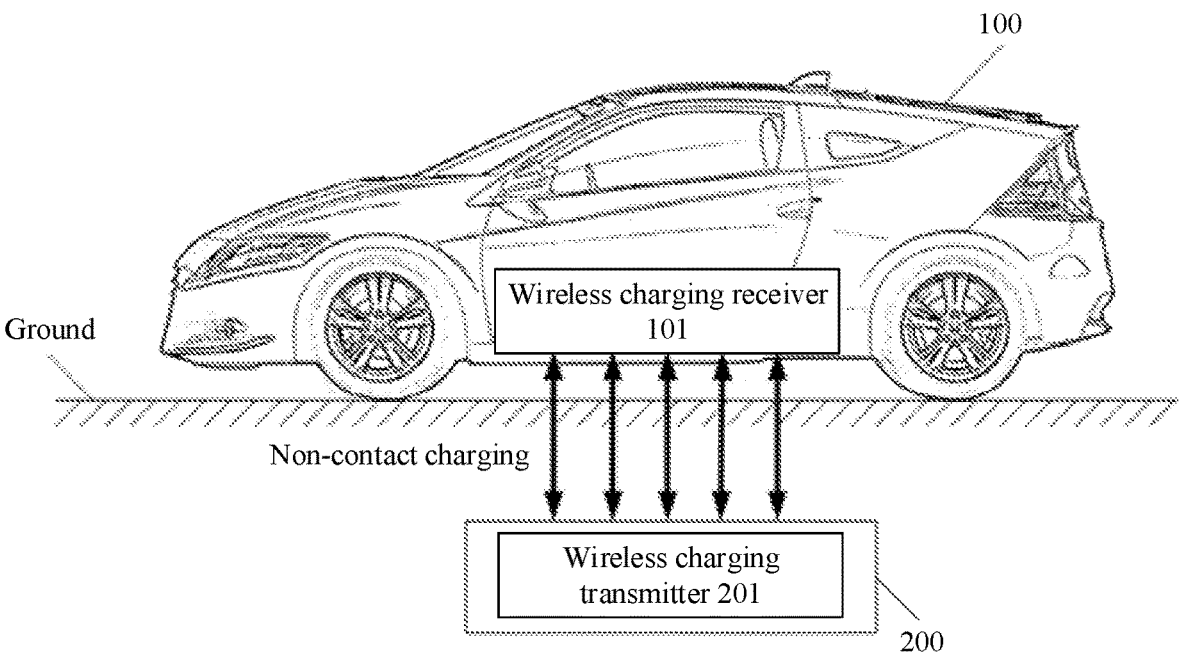
FIG. 1 is a schematic diagram of a wireless charging system of an electric vehicle.

FIG. 1 is a schematic diagram of a wireless charging system of an electric vehicle.

The wireless charging system may include at least the electric vehicle 100 and a wireless charging station 200.

A wireless charging receiver 101 is located on the electric vehicle 100, and a wireless charging transmitter 201 is located at the wireless charging station 200 on the ground.

A charging process of the wireless charging system is that the wireless charging receiver 101 and the wireless charging transmitter 201 complete transfer of electric energy through non-contact charging to charge a power battery pack.

The wireless charging station 200 may be specifically a fixed wireless charging station, a fixed wireless charging parking space, a wireless charging road, or the like. The wireless charging transmitter 201 may be disposed on the ground or buried under the ground (the figure shows a case in which the wireless charging transmitter 201 is buried under the ground).

The wireless charging receiver 101 may be integrated into a bottom of the electric vehicle 100. When the electric vehicle 100 enters a wireless charging range of the wireless charging transmitter 201, the electric vehicle 100 can be charged in a wireless charging manner. A power receive module and a rectifier circuit of the wireless charging receiver 101 may be integrated or may be separated. This is not specifically limited in this application. When the power receive module and the rectifier circuit are separated, a rectifier of the rectifier circuit is usually placed in the vehicle.

A power transmit module and an inverter of the wireless charging transmitter 201 may be integrated or may be separated. In addition, non-contact charging may be that the wireless charging receiver 101 and the wireless charging transmitter 201 perform energy transmission through electric field or magnetic field coupling, which may be specifically implemented in a manner such as electric field induction, magnetic induction, magnetic resonance, or wireless radiation. This is not specifically limited in this embodiment of this application. Bidirectional charging can be further performed between the electric vehicle 100 and the wireless charging station 200. To be specific, the wireless charging station 200 can charge the electric vehicle 100 by using a power supply; and the electric vehicle 100 can also be discharged to the power supply.

Figure 2:
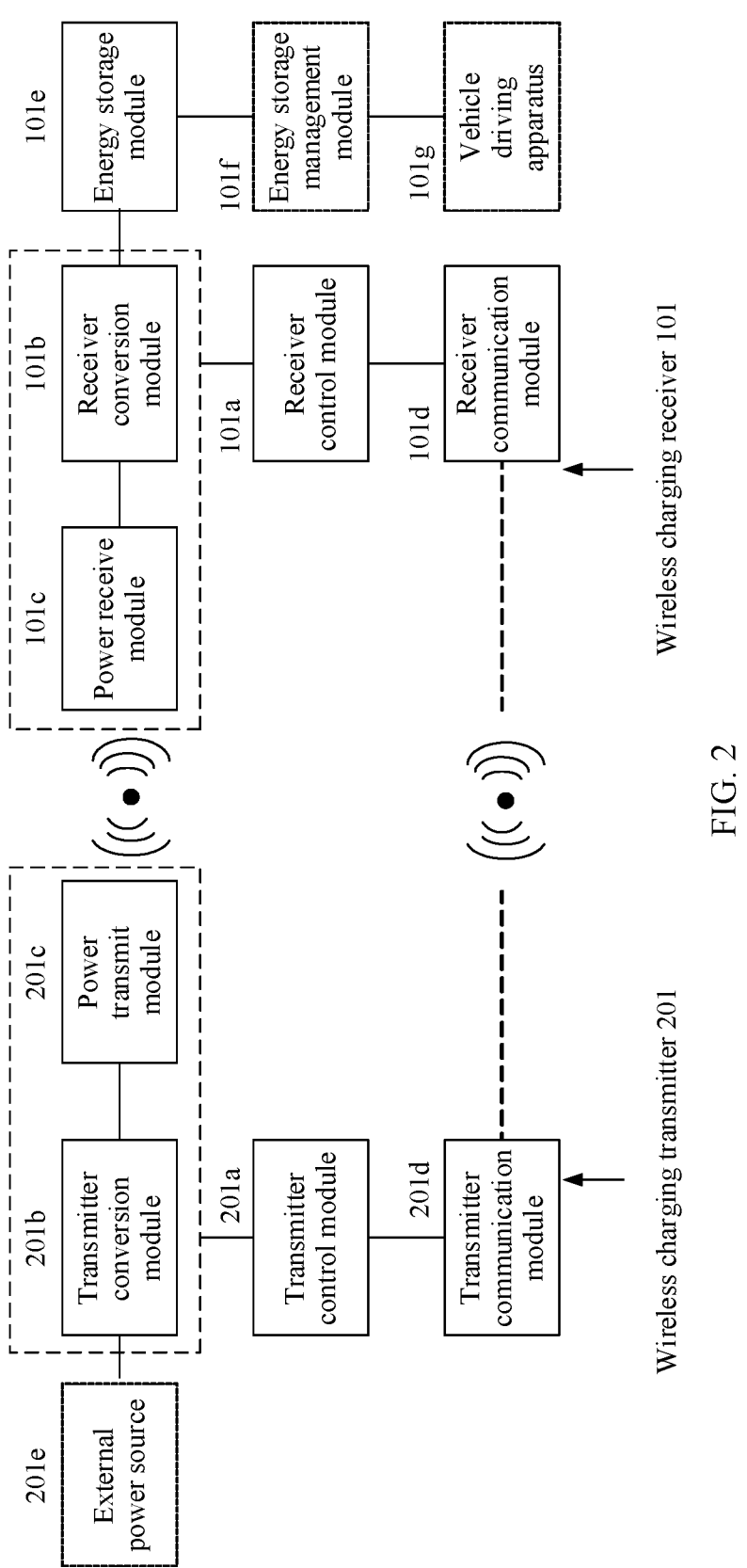
FIG. 2 is a schematic diagram of a structure of the wireless charging system of the electric vehicle provided in FIG. 1.

FIG. 2 is a schematic diagram of a structure of the wireless charging system of the electric vehicle provided in FIG. 1.

The wireless charging transmitter 201 shown in the figure includes a transmitter control module 201*a*, a transmitter conversion module 201*b*, a power transmit module 201*c*, and a transmitter communication module 201*d*.

The wireless charging receiver 101 includes a receiver control module 101*a*, a receiver conversion module 101*b*, a power receive module 101*c*, and a receiver communication module 101*d*.

In addition, the receiver conversion module 101*b* may be connected to an energy storage module 101*e* and an energy storage management module 101*f*, so that received energy is used to charge the energy storage module 101*e* and further used to drive the electric vehicle. A connection between the energy storage module 101*e* and the energy storage management module 101*f* may be located inside the wireless charging receiver 101, or may be located outside the wireless charging receiver 101. This is not specifically limited in this application.

The transmitter conversion module 201*b* is connected to an external power source 201*e*, and converts alternating current or direct current obtained from the external power source 201*e* into high-frequency alternating current. When an input of the external power source 201*e* is alternating current, the transmitter conversion module 201*b* includes at least a power factor correction unit (not shown in the figure) and an inverter unit (not shown in the figure). When an input of the external power source 201*e* is direct current, the transmitter conversion module 201*b* includes at least an inverter unit. The power factor correction unit is a rectifier circuit that can convert alternating current into direct current, and can also make a phase of an input current of the wireless charging system the same as a phase of a power grid voltage, thereby reducing harmonic content of the wireless charging system and increasing a power factor value, so as to reduce pollution caused by the wireless charging system to a power grid and improve reliability. The power factor correction unit may further increase or decrease an output voltage of the power factor correction unit based on a requirement of a subsequent stage. When a variable voltage range does not meet the requirement, a direct current conversion unit may be further added to increase the voltage. The inverter unit converts the voltage output by the power factor correction unit into a high-frequency alternating current voltage, and then the high-frequency alternating current voltage acts on the power transmit module 201*c*. The high-frequency alternating current voltage can increase transmission efficiency and a transmission distance.

The external power source 201*e* may be located inside or outside the wireless charging transmitter 201*d*. This is not specifically limited in this embodiment of this application.

The power transmit module 201*c* is configured to transmit, in a form of an alternating magnetic field, the alternating current output by the transmitter conversion module 201*b*. The power transmit module 201*c* includes a power transmit coil and a transmitter compensation network.

The transmitter control module 201*a* mainly includes a control chip and an electronic circuit, and can control voltage, current, and frequency conversion parameter adjustment of the transmitter conversion module 201*b* based on an actual transmit power requirement of wireless charging, so as to control a voltage and current of the high-frequency alternating current in the power transmit module 201*c*.

Wireless communication is implemented between the transmitter communication module 201*d* and the receiver communication module 101*d*, and specifically includes power control information, fault protection information, on/off information, interaction authentication information, and the like. The wireless charging transmitter 201 may receive information such as attribute information of the electric vehicle, a charging request, and interaction authentication information that are sent by the wireless charging receiver 101. In addition, the wireless charging transmitter 201 may further send wireless charging transmission control information, interaction authentication information, historical data information of wireless charging, and the like to the wireless charging receiver 101. Specifically, a manner of the wireless communication may include but is not limited to a combination of any one or more of Bluetooth, wireless fidelity (Wi-Fi), a Zigbee protocol, a radio frequency identification (RFID) technology, a long range (Lora) wireless technology, and a near field communication (NFC) technology. Further, the transmitter communication module 201*d* may further communicate with an intelligent terminal of a user to which the electric vehicle belongs, and the user to which the electric vehicle belongs implements remote authentication and user information transmission by using a communication function.

The power receive module 101*c* includes a power receive coil and a receiver compensation network, and is configured to receive, in the form of an alternating magnetic field, electromagnetic energy transmitted by the power transmit module 201*c*.

Structure combination forms of compensation circuits of the power transmit module 201*c* and the power receive module 101*c* in the wireless charging system include an S-S type. a P-P type, an S-P type, a P-S type, an LCL-LCL type, an LCL-P type, an LCC-LCC type, and the like. This is not specifically limited in this embodiment of this application.

Functions of the wireless charging transmitter 201 and the wireless charging receiver 101 may be interchanged, that is, the wireless charging receiver 101 may also charge the wireless charging transmitter 201. In this case, to implement a bidirectional charging function, each of the wireless charging transmitter 201 and the wireless charging receiver 101 may include both a power receive coil and a power transmit coil, and the power receive coil and the power transmit coil at the same end may be separate or integrated.

The receiver conversion module 101*b* converts a high-frequency resonant current and voltage received by the power receive module 101*c* into a direct current voltage and a direct current that are needed for charging the energy storage module 101*e*.

The receiver conversion module 101*b* usually includes a rectifier unit (not shown in the figure) and a direct current conversion unit (not shown in the figure). The rectifier unit converts the high-frequency resonant current and voltage received by the power receive module 101*c* into the direct current and the direct current voltage. The direct current conversion unit provides the direct current voltage for a subsequent charging circuit, to perform voltage adjustment. In some embodiments, alternatively, the receiver conversion module 101*b* may have no direct current conversion unit, in which case a function of the direct current conversion unit is implemented by the rectifier unit.

The receiver control module 101*a* mainly includes a control chip and an electronic circuit, and can control parameters such as a voltage, current, and frequency of the receiver conversion module 101*b* based on an actual receive power requirement of wireless charging.

Figure 3:
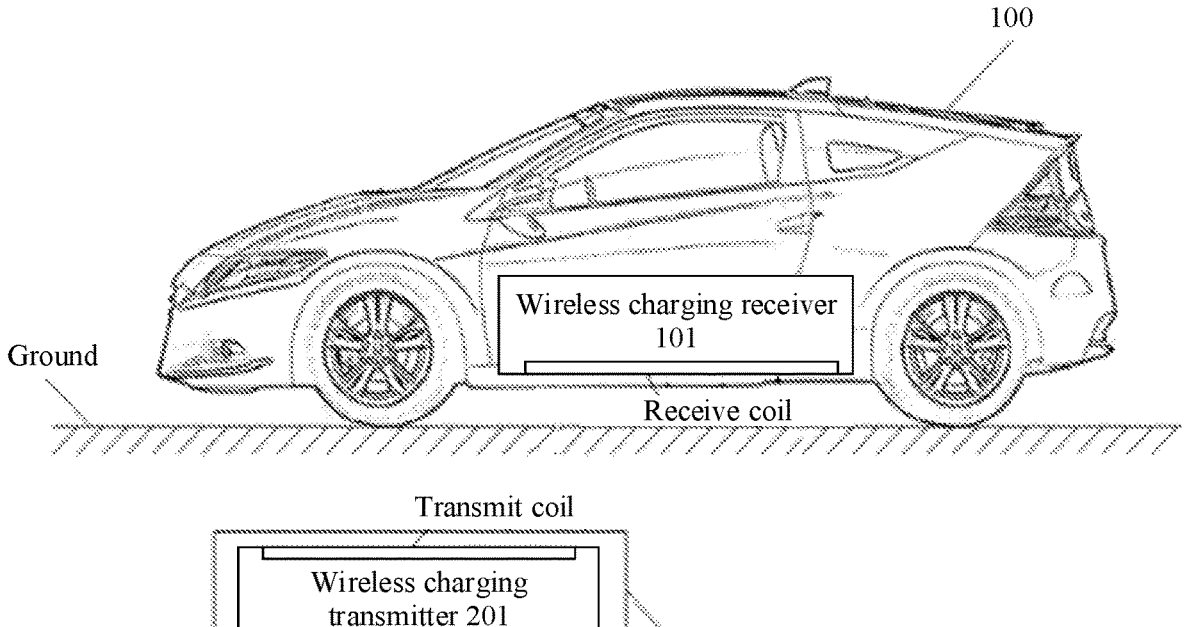
FIG. 3 is a schematic diagram of misalignment of a power receive coil and a power transmit coil.

FIG. 3 is a schematic diagram of misalignment of a power receive coil and a power transmit coil.

A power transmit coil of a transmitter is located outside an electric vehicle, and a power receive coil of a receiver is located on the electric vehicle. Therefore, when the power receive coil and the power transmit coil are misaligned, wireless charging power and wireless charging efficiency are reduced.

To improve an alignment degree between the power receive coil and the power transmit coil, relative positions of the power receive coil and the power transmit coil may be obtained and then presented to a driver or a self-driving system, to guide the driver or the system in aligning the two coils during parking.

To obtain the relative positions of the power receive coil and the power transmit coil, detection methods such as an optical detection method, an acoustic detection method, and a magnetic field detection method may be used. The optical and acoustic methods are hardly applicable to this scenario because of a problem of blocking. The magnetic field method may be unaffected by blocking. A method using a low-frequency magnetic field is comparatively common at present.

Figure 4:
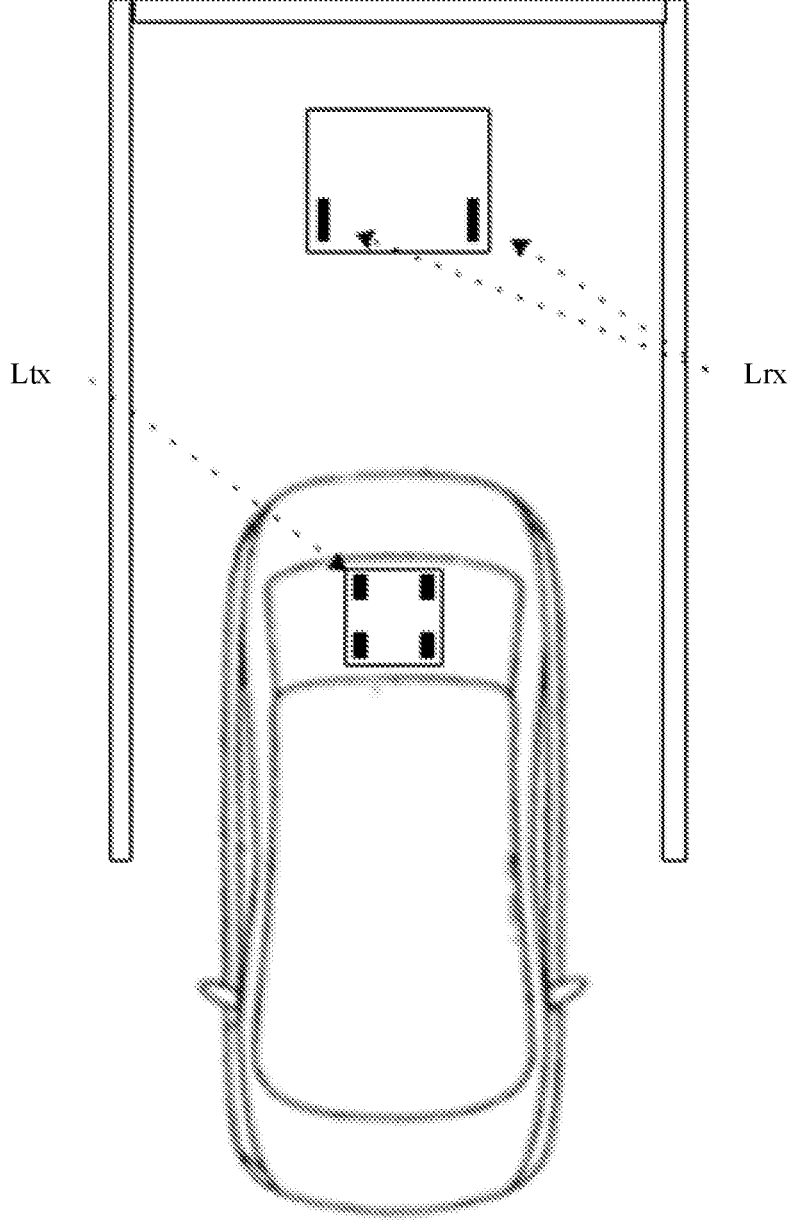
FIG. 4 is a schematic diagram of guiding alignment of a power transmit coil and a power receive coil by using a low-frequency magnetic field.

FIG. 4 is a schematic diagram of guiding alignment of a power transmit coil and a power receive coil by using a low-frequency magnetic field.

When a low-frequency magnetic field is used to guide alignment of the power transmit coil and the power receive coil, a low-frequency magnetic field transmit coil Ltx is added to a wireless charging transmitter, and the low-frequency magnetic field transmit coil Ltx is driven by an internal circuit to generate a low-frequency alternating magnetic field; and a low-frequency magnetic field receive coil Lrx is added to a wireless charging receiver, to generate an induced signal (induced voltage or induced current) in the alternating magnetic field. An amplitude of the induced signal is related to a position, and relative position information of the low-frequency magnetic field transmit coil and the low-frequency magnetic field receive coil is obtained by detecting the amplitude of the induced signal. Further, because relative positions of the low-frequency magnetic field transmit coil and the power transmit coil can be predetermined, and relative positions of the low-frequency magnetic field receive coil and the power receive coil can be predetermined, relative position information of the power transmit coil and the power receive coil can be determined based on the relative position information of the low-frequency magnetic field transmit coil and the low-frequency magnetic field receive coil.

Figure 5:
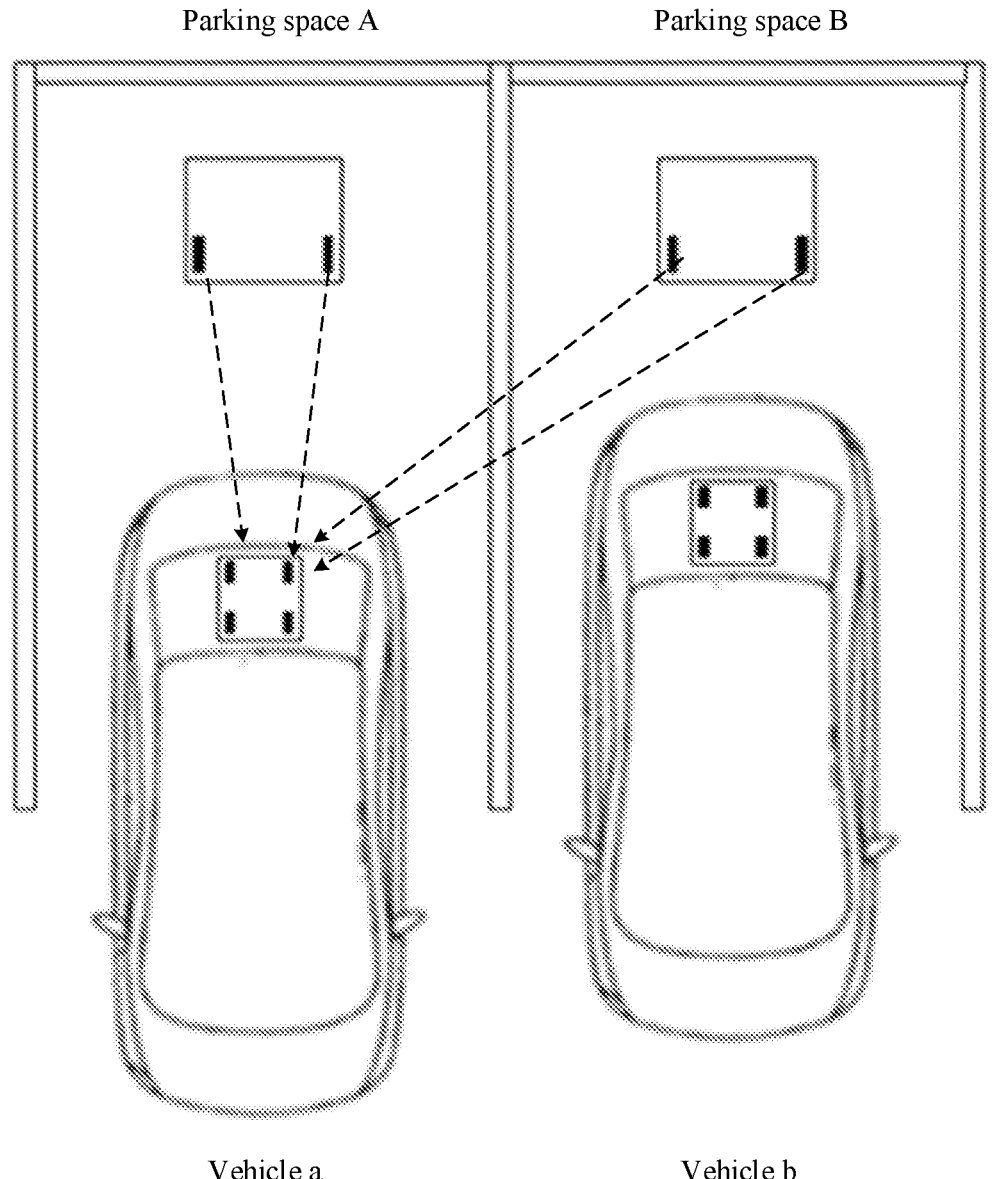
FIG. 5 is a schematic diagram of guiding alignment of power transmit coils and power receive coils by using low-frequency magnetic fields simultaneously in adjacent parking spaces.

FIG. 5 is a schematic diagram of guiding alignment of power transmit coils and power receive coils by using low-frequency magnetic fields simultaneously in adjacent parking spaces.

When a low-frequency magnetic field is used to guide alignment, an effective range is comparatively large, for example, a distance can be up to several meters. Therefore, the alignment may be affected by a low-frequency alternating magnetic field generated by a low-frequency magnetic field transmit coil of an adjacent parking space. For example, a low-frequency alternating magnetic field generated by a low-frequency magnetic field transmit coil of a parking space of a vehicle b acts on a low-frequency magnetic field receive coil of a vehicle a, and consequently, interference is sequentially caused, affecting an amplitude of an induced signal obtained by the vehicle a. As a result, relative position information obtained by the vehicle a is inaccurate.

To resolve the foregoing technical problem, the embodiments of this application provide a wireless charging receiver, transmitter, system, and control method, and an electric vehicle. Before alignment guiding, it is ensured that a low-frequency magnetic field transmit coil of a transmitter of a local parking space sends no low-frequency magnetic field signal. In addition, it is detected whether there is an interfering magnetic field signal on a low-frequency magnetic field receive coil of a receiver at this moment, and when there is an interfering magnetic field signal, a signal feature of the interfering magnetic field signal is identified. Then, a different signal feature is allocated to a low-frequency magnetic field signal that is to be generated in the local parking space. In this case, the receiver guides alignment of a power transmit coil and a power receive coil by using only an induced signal having the signal feature of the local parking space. Therefore, interference between low-frequency magnetic field signals of adjacent parking spaces can be avoided, so that obtained relative positions of the low-frequency magnetic field transmit coil and the low-frequency magnetic field receive coil are more accurate. In this way, the power receive coil and the power transmit coil can be aligned more accurately.

In the following descriptions, the words such as "first" and "second" are merely used for a purpose of description, and shall not be understood as indication or implication of relative importance or implicit indication of a quantity of indicated technical features. Therefore, a feature limited by "first" or "second" may explicitly indicate or implicitly include one or more such features. In the descriptions of this application, unless otherwise stated, "a plurality of" means two or more than two.

Apparatus Embodiment 1

Figure 6:
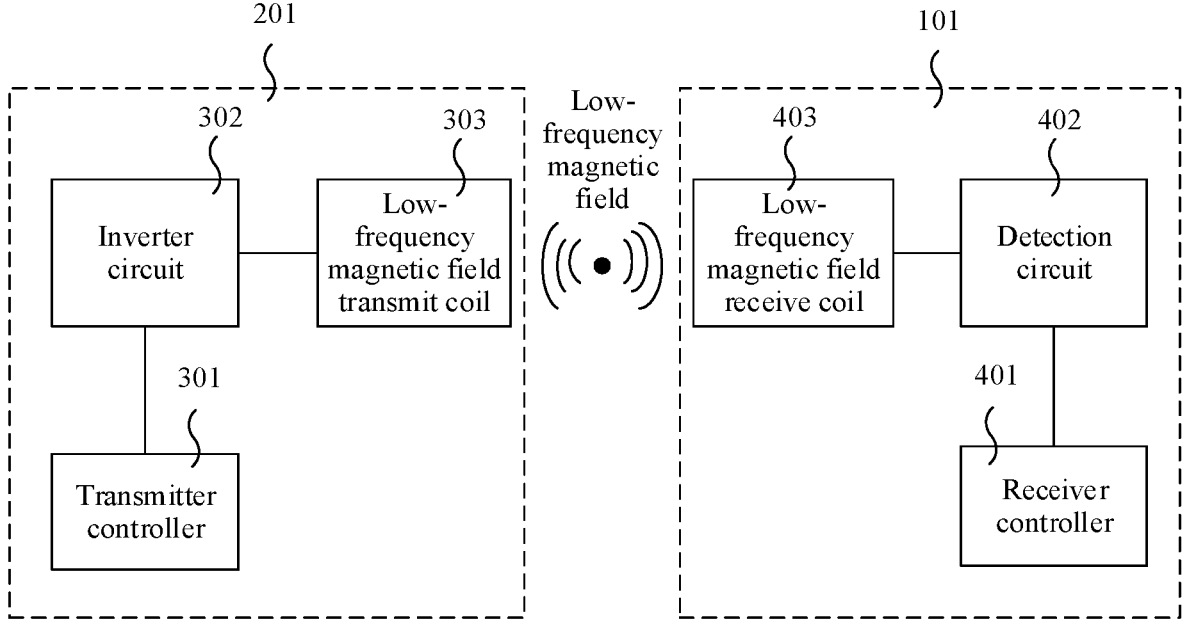
FIG. 6 is a schematic diagram of a wireless charging system corresponding to a wireless charging receiver according to an embodiment of this application.

FIG. 6 is a schematic diagram of a wireless charging system corresponding to a wireless charging receiver according to this embodiment of this application.

The wireless charging system includes a wireless charging receiver 101 and a wireless charging transmitter 201.

The wireless charging receiver (referred to as a receiver below) 101 includes a receiver controller 401, a low-frequency magnetic field receive coil 403, and a power receive coil (not shown in the figure).

The wireless charging transmitter 201 (referred to as a transmitter below) includes a transmitter controller 301, a low-frequency magnetic field transmit coil 302, and a power transmit coil (not shown in the figure).

The power transmit coil transmits alternating current in a form of an alternating magnetic field.

The power receive coil converts the alternating magnetic field transmitted by the power transmit coil into alternating current.

The low-frequency magnetic field transmit coil 303 transmits the alternating current in a form of a low-frequency magnetic field. The transmitter 201 may include one or more low-frequency magnetic field transmit coils 303. A quantity of low-frequency magnetic field transmit coils 303 is not specifically limited in this embodiment of this application.

The low-frequency magnetic field receive coil 403 converts the low-frequency magnetic field into an induced signal. The induced signal may be an induced voltage or an induced current. This is not specifically limited in this embodiment of this application. The receiver 101 may include one or more low-frequency magnetic field receive coils 403. A quantity of low-frequency magnetic field receive coils 403 is not specifically limited in this embodiment of this application.

Low-frequency magnetic fields received by the low-frequency magnetic field receive coil 403 may be generated by low-frequency magnetic field transmit coils of a plurality of wireless charging transmitters, that is, there may be an interfering signal in induced signals generated in this case. In this embodiment of this application, interference between low-frequency magnetic field signals of adjacent parking spaces is avoided by using a signal feature of an induced signal. Details are described below:

It can be understood that there is a correspondence between the transmitter 201 and the receiver 101. In the following, the transmitter 201 for wirelessly charging the receiver 101 is referred to as a transmitter corresponding to the receiver 101, and a transmitter that does not charge the receiver 101 and whose position is close to the receiver 101 is referred to as another transmitter. In some embodiments, when a receiver is located on an electric vehicle, a transmitter of a parking space in which the electric vehicle is currently located is a corresponding transmitter, and a transmitter of a nearby parking space is another transmitter.

When all low-frequency magnetic field transmit coils 303 stop working, the low-frequency magnetic field transmit coils 303 send no low-frequency magnetic field. The low-frequency magnetic field receive coil 403 of the receiver 101 works normally. In this case, a low-frequency magnetic field received by the low-frequency magnetic field receive coil 403 is a low-frequency magnetic field transmitted by a low-frequency magnetic field transmit coil of the another transmitter, that is, an interfering magnetic field. Therefore, an induced signal Substitute Specification (('lean copy) obtained through conversion by the receive coil is an interfering signal.

In this case, the receiver controller obtains a signal feature of the interfering signal, allocates a signal feature different from that of the interfering signal to each low-frequency magnetic field transmit coil 303 of the transmitter 201, and sends a correspondence between each low-frequency magnetic field transmit coil and the allocated signal feature to the transmitter 201.

For example, when the transmitter 201 includes two low-frequency magnetic field transmit coils Ltx1 and Ltx2, and the signal feature is a pulse time width of the signal, when the receiver controller obtains pulse time widths 1 ms and 3 ms of interfering signals, the receiver controller may allocate a pulse time width 2 ms to Ltx1, allocate a pulse time width 4 ms to Ltx2, and send a correspondence between the low-frequency magnetic field transmit coil and the allocated pulse time width to the transmitter 201.

In some embodiments, alternatively, there may be no interfering magnetic field. In this case, the receiver controller obtains no signal feature of an interfering signal, and a signal feature allocated by the receiver controller to each low-frequency magnetic field transmit coil 303 is a preset signal feature.

After receiving the correspondence between the low-frequency magnetic field transmit coil 303 and the allocated signal feature, the transmitter controller 401 controls a working status of an inverter circuit 302 based on the correspondence, so that each low-frequency magnetic field transmit coil 303 works. In this case, after the low-frequency magnetic field transmitted by each low-frequency magnetic field transmit coil 303 is received by the low-frequency magnetic field receive coil 403, a signal feature of the generated induced signal is the allocated signal feature.

Still referring to the foregoing example, the transmitter controller 301 controls the working status of the inverter circuit 302, to make the low-frequency magnetic field transmit coil Ltx1 keep transmitting a low-frequency magnetic field for 2 ms, so that the low-frequency magnetic field receive coil 403 can obtain, through conversion, an induced signal whose pulse time width is 2 ms; and make the low-frequency magnetic field transmit coil Ltx2 keep transmitting a low-frequency magnetic field for 4 ms, so that the low-frequency magnetic field receive coil 403 can obtain, through conversion, an induced signal whose pulse time width is 4 ms.

When induced signals obtained by the receiver controller 401 include an interfering signal, the receiver controller 401 determines relative positions of the power transmit coil and the power receive coil by using the induced signal having the allocated signal feature, and an induced signal without the allocated signal feature is the interfering signal and is not used to determine the relative positions. In this way. interference from a low-frequency magnetic field transmitted by the low-frequency magnetic field transmit coil of the another transmitter is avoided.

In some embodiments, the receiver controller 401 may directly detect the signal feature of the induced signal of the low-frequency magnetic field receive coil 403. In some other embodiments, the signal feature of the induced signal of the low-frequency magnetic field receive coil 403 may be obtained by using a detection circuit 402, and transmitted to the receiver controller 401. A manner in which the receiver controller 401 obtains the signal feature is not specifically limited in this embodiment of this application.

In some embodiments, communication between the receiver controller 401 and the transmitter controller 301 is implemented by using a communication module. In a possible implementation, the communication may be implemented by using the receiver communication module 101d and the transmitter communication module 201d shown in FIG. 2. In another possible implementation, the communication may be implemented by using a communication module that is separately disposed and that is independent of the communication modules 101d and 201d. This is not specifically limited in this embodiment of this application.

In some embodiments, the receiver controller 401 and the transmitter controller 301 in this embodiment of this application may be an application-specific integrated circuit (ASIC). a programmable logic device (PLD), a digital signal processor (DSP), or a combination thereof. The PLD may be a complex programmable logic device (CPLD), a field-programmable gate array (FPGA), a generic array logic (GAL), or any combination thereof.

Still referring to FIG. 2, the receiver controller 401 may be integrated with the receiver control module 101a, or may be separately disposed and independent of the receiver control module 101a; and the transmitter controller 301 may be integrated with the transmitter control module 201a, or may be separately disposed and independent of the transmitter control module 201a. This is not specifically limited in this embodiment of this application.

To sum up, the receiver controller of the receiver provided in this embodiment of this application allocates the signal feature different from that of the currently obtained induced signal to each low-frequency magnetic field transmit coil when all the low-frequency magnetic field transmit coils of the wireless charging transmitter stop working, that is, the signal feature allocated to the low-frequency magnetic field transmit coil is different from that of the interfering signal. The receiver controller further sends the correspondence between each low-frequency magnetic field transmit coil and the allocated signal feature to the wireless charging transmitter. The transmitter controller receives the correspondence, and controls the inverter circuit based on the correspondence so that each low-frequency magnetic field transmit coil works. In this case, the receiver controller can determine the relative positions of the power transmit coil and the power receive coil by using the induced signal having the allocated signal feature, and the induced signal without the allocated signal feature is the interfering signal and is not used to determine the relative positions. Therefore, interference between low-frequency magnetic field signals of adjacent parking spaces can be avoided, so that the obtained relative positions of the power transmit coil and the power receive coil are more accurate.

The following describes working principles of a receiver and a transmitter by using examples in which a signal feature is a signal pulse width, a signal code, and a signal frequency. It can be understood that the signal feature may alternatively be another feature, but an implementation principle is similar, and details are not described in this application.

In addition, for ease of description, the following embodiments are all described by using an example in which a receiver includes four low-frequency magnetic field receive coils and a transmitter includes two low-frequency magnetic field transmit coils. It can be understood that quantities of low-frequency magnetic field receive coils and low-frequency magnetic field transmit coils may alternatively have different values, but an implementation principle is similar, and details are not described in the embodiments of this application.

Apparatus Embodiment 2

The following first describes working principles of a receiver and a transmitter when a signal feature is a signal pulse width. The signal pulse width is a time width of a signal pulse.

Figure 7:
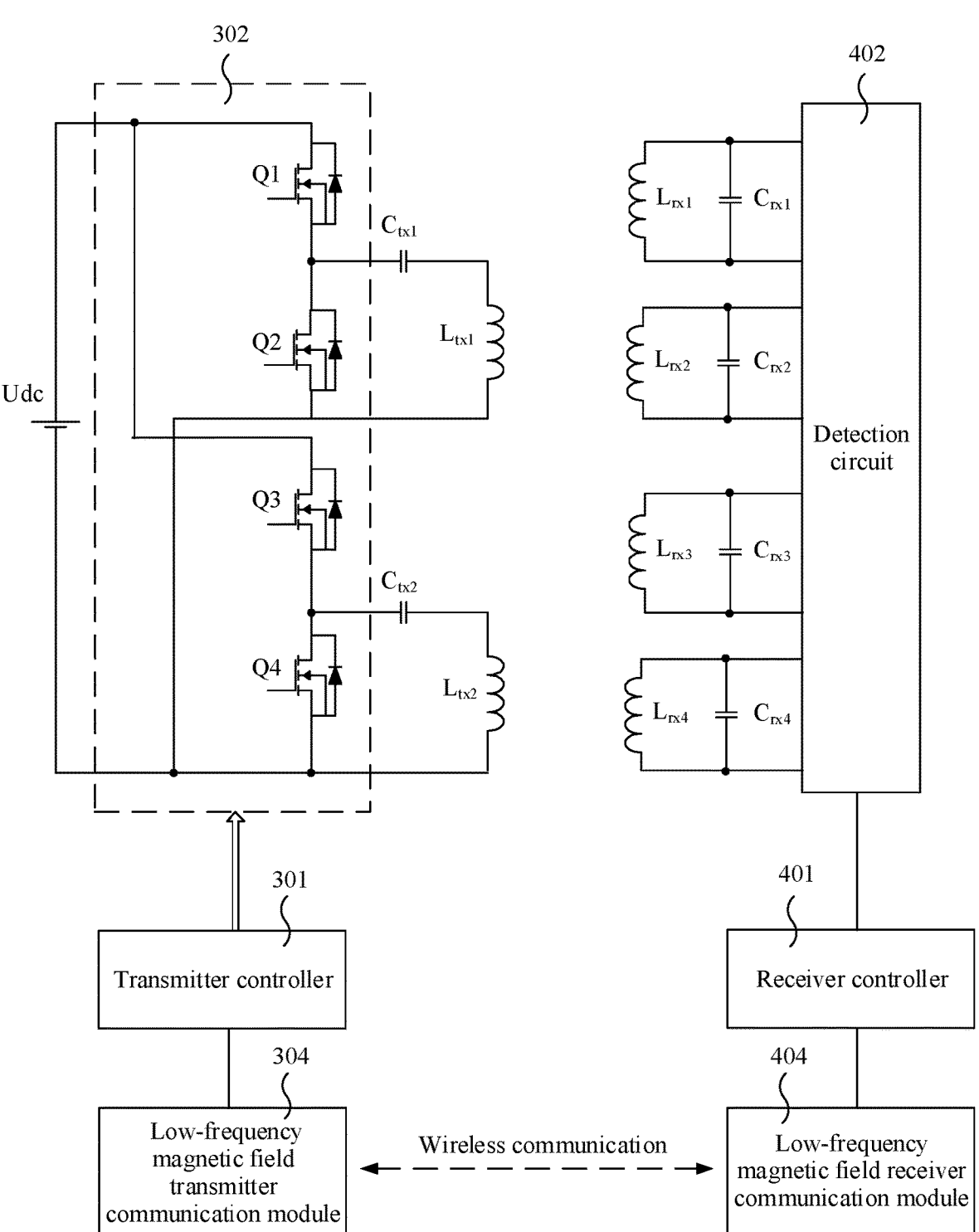
FIG. 7 is a schematic diagram of a wireless charging system according to an embodiment of this application.

FIG. 7 is a schematic diagram of a wireless charging system according to this embodiment of this application.

A wireless charging transmitter includes low-frequency magnetic field transmit coils Ltx1 and Ltx2, a transmitter controller 301, an inverter circuit 302, and a low-frequency magnetic field transmitter communication module 304.

A wireless charging receiver includes low-frequency magnetic field receive coils Lrx1 to Lrx4, a receiver controller 401, a detection circuit 402, and a low-frequency magnetic field receiver communication module 404.

In this embodiment of this application, an example in which the inverter circuit 302 is specifically two half-bridge inverter circuits is used for description. A half-bridge inverter circuit including switching transistors Q1 and Q2 is configured to convert direct current into alternating current and then transmit the alternating current to the low-frequency magnetic field transmit coil Ltx1. A half-bridge inverter circuit including switching transistors Q3 and Q4 is configured to convert direct current into alternating current and then transmit the alternating current to the low-frequency magnetic field transmit coil Ltx2.

A power source Udc is a direct current power source. Still referring to FIG. 2, when the external power source 201e connected to the transmitter is a direct current power source, the power source Udc may be the external power source 201e or obtained by performing direct current-direct current (DC-DC) conversion on the external power source 201e: or when the external power source 201e connected to the transmitter is an alternating current power source, the power source Udc may be obtained through rectification by the external power source 201e.

An input terminal of the detection circuit 402 is connected to the low-frequency magnetic field receive coils Lrx1 to Lrx4, and an output terminal of the detection circuit 402 is connected to the receiver controller 401, to obtain amplitudes and signal pulse widths of induced signals of the low-frequency magnetic field receive coils Lrx1 to Lrx4, and send the amplitudes and the signal pulse widths to the receiver controller 401.

There may be one or more detection circuits 402. This is not specifically limited in this embodiment of this application. In some embodiments, a quantity of detection circuits 402 may be the same as a quantity of low-frequency magnetic field receive coils, and the detection circuits are connected to the low-frequency magnetic field receive coils in a one-to-one correspondence.

Wireless communication may be performed between the transmitter and the receiver by using the low-frequency magnetic field transmitter communication module 304 and the low-frequency magnetic field receiver communication module 404. Information transmitted between the transmitter and the receiver is interpreted by using a communication protocol with which the two parties both comply.

The following specifically describes the working principles of the receiver and the transmitter when guiding alignment of a power transmit coil and a power receive coil.

First, the wireless charging transmitter initiates an alignment guiding request, or the wireless charging receiver initiates an alignment guiding request. The following provides descriptions by using an example in which the receiver initiates the alignment guiding request.

A manner of initiating the request may be as follows: The receiver controller 401 sends the alignment guiding request to the transmitter by using the low-frequency magnetic field receiver communication module 404, where the alignment guiding request is used to request the transmitter to guide alignment. That is, the communication protocol with which the transmitter and the receiver both comply may interpret the alignment guiding request as requesting the transmitter to guide alignment by transmitting a low-frequency magnetic field.

The transmitter controller 301 receives the alignment guiding request by using the low-frequency magnetic field transmitter communication module 304, and responds to the receiver. Specifically, the transmitter controller 301 sends first response information to the receiver, where the first response information includes parameters of all the low-frequency magnetic field transmit coils.

The parameters include identification information of each of the low-frequency magnetic field transmit coils Ltx1 and Ltx2, size information, and relative position information of each of Ltx1 and Ltx2 and the power transmit coil. The identification information is used to distinguish between the low-frequency magnetic field transmit coils Ltx1 and Ltx2. The size information is used to determine relative positions of the low-frequency magnetic field transmit coil and the low-frequency magnetic field receive coil. The relative position information needs to be used when converting the relative positions of the low-frequency magnetic field transmit coil and the low-frequency magnetic field receive coil into relative positions of the power transmit coil and the power receive coil.

After receiving the first response information, the receiver controller 401 sends a first instruction to the transmitter. The first instruction is used to instruct the transmitter to control both the low-frequency magnetic field transmit coils to stop working. The receiver controller 401 may store the parameters in the first response information in a storage unit of the receiver controller 401 or store the parameters in a memory of the receiver, to invoke the parameters when the parameters need to be used.

After receiving the first instruction, the transmitter controller 301 sends a control signal for stopping working to the switching transistors Q1 to Q4 of the inverter circuit 302, so that both the low-frequency magnetic field transmit coils Ltx1 and Ltx2 stop transmitting low-frequency magnetic fields.

A type of the switching transistor may be any one of the following: a relay, an insulated gate bipolar transistor (IGBT), a metal-oxide-semiconductor field-effect transistor (MOSFET, MOS transistor for short below), a SiC MOS-FET (Silicon Carbide Metal Oxide Semiconductor Field Effect Transistor), or the like. When the switching transistor is a MOS transistor, the switching transistor may be specifically a PMOS transistor or an NMOS transistor. This is not specifically limited in this embodiment of this application. The following provides descriptions by using an example in which the switching transistor is specifically an NMOS transistor. In this case, the control signal may be a PWM (pulse width modulation) signal. When the control signal is of a low level, the switching transistor is turned off. When the control signal is of a high level, the switching transistor is turned on. Therefore, the control signal sent by the transmitter controller 301 to the switching transistors Q1 to Q4 of the inverter circuit 302 is of a low level, so that all the switching transistors Q1 to Q4 are in an off state.

After the transmitter controller 301 controls the switching transistors Q1 to Q4 to be turned off, the low-frequency magnetic field transmit coils Ltx1 and Ltx2 transmit no low-frequency magnetic field. Then, the transmitter controller 301 sends second response information to the receiver. The second response information is used to indicate, to the receiver, that both the low-frequency magnetic field transmit coils have stopped working.

When the second response information sent by the transmitter is received, the receiver controller 401 learns that both the low-frequency magnetic field transmit coils of the corresponding transmitter stop transmitting low-frequency magnetic fields. In this case, a magnetic field signal received by the low-frequency magnetic field receive coils Lrx1 to Lrx4 of the receiver is an interfering magnetic field transmitted by another transmitter, and therefore an induced signal obtained through conversion is an interfering signal. The detection circuit 402 detects a signal pulse width of the interfering signal, and sends the signal pulse width to the receiver controller 401.

The receiver controller 401 obtains the signal pulse width of the current interfering signal, and allocates a signal pulse width different from that of the interfering signal to each low-frequency magnetic field transmit coil. In some embodiments, the receiver controller 401 may obtain signal pulse widths of a plurality of different interfering signals. For example, the signal pulse widths may be 1 ms and 3 ms. To distinguish from the interfering signals, each of signal pulse widths allocated by the receiver controller 401 to the low-frequency magnetic field transmit coils Ltx1 and Ltx2 needs to be different from 1 ms and 3 ms. For example, the allocated signal pulse widths may be 2 ms and 4 ms, respectively. It can be understood that the signal pulse widths allocated to the low-frequency magnetic field transmit coils Ltx1 and Ltx2 may be the same or may be different. This is not specifically limited in this embodiment of this application.

In some embodiments, alternatively, there may be no interfering magnetic field. In this case, the receiver controller obtains no signal feature of an interfering signal, and a signal pulse width allocated by the receiver controller to each low-frequency magnetic field transmit coil 303 is a preset signal pulse width.

The induced signal may be an induced voltage or an induced current. This is not specifically limited in this embodiment of this application.

In some embodiments, when detecting that an amplitude of an induced signal is greater than a preset amplitude, the detection circuit 402 determines that an interfering signal is detected. The preset amplitude may be determined based on an actual situation. This is not specifically limited in this embodiment of this application. For example, when the induced signal is an induced voltage, and an amplitude of the obtained induced voltage is greater than 30 mV, the receiver controller 401 determines that an interfering signal is present.

Then, the receiver controller 401 sends a second instruction to the transmitter. The second instruction includes a correspondence between each low-frequency magnetic field transmit coil and the allocated signal pulse width. Still referring to the foregoing example, the second instruction can inform the transmitter that the signal pulse width allocated to the low-frequency magnetic field transmit coil Ltx1 is 2 ms and the signal pulse width allocated to the low-frequency magnetic field transmit coil Ltx2 is 4 ms. The second instruction is further used to request the transmitter to control the low-frequency magnetic field transmit coils to start transmitting low-frequency magnetic fields.

After receiving the second instruction, the transmitter controller 301 adjusts a duty cycle and/or a frequency of a control signal of the switching transistor in the inverter circuit 302 based on the correspondence carried in the second instruction, so that the low-frequency magnetic field transmit coils transmit low-frequency magnetic fields at different times. Still referring to the foregoing example, the transmitter controller 301 controls on/off states of the switching transistors Q1 to Q4 of the two half-bridge inverter circuits, so that the low-frequency magnetic field transmit coil Ltx1 transmits a magnetic field while the low-frequency magnetic field transmit coil Ltx1 does not transmit a magnetic field, and Ltx1 keeps sending a low-frequency magnetic field for 2 ms and then stops: then, after a preset time interval, the transmitter controller 301 controls the low-frequency magnetic field transmit coil Ltx2 to transmit a magnetic field while the low-frequency magnetic field transmit coil Ltx1 does not transmit a magnetic field, and Ltx2 keeps sending a low-frequency magnetic field for 4 ms and then stops; and then, still after the preset time interval, the foregoing process is repeated. In this way, the low-frequency magnetic fields transmitted by the low-frequency magnetic field transmit coils Ltx1 and Ltx2 can cause each low-frequency magnetic field receive coil to generate an induced signal having an allocated signal pulse width.

The receiver controller 401 obtains the pulse time widths of the induced signals of the low-frequency magnetic field receive coils Lrx1 to Lrx4 by using the detection circuit 402. In this case, the induced signals may still include an interfering signal, but the receiver controller 401 can determine, based on the pulse time width, whether the induced signal is an interfering signal. Still referring to the foregoing example, the receiver controller 401 determines that an induced signal whose signal pulse width is neither 2 ms nor 4 ms is an interfering signal, and then determines, based on the correspondence between the allocated signal pulse width and the low-frequency magnetic field transmit coil, the low-frequency magnetic field transmit coils sending the low-frequency magnetic fields that generate the induced signals of 2 ms and 4 ms, that is, determines that the signal pulse width 2 ms corresponds to the low-frequency magnetic field transmit coil Ltx1 and the signal pulse width 4 ms corresponds to the low-frequency magnetic field transmit coil Ltx2. Then, the receiver controller 401 obtains, from the detection circuit 402, amplitudes of the induced signals respectively corresponding to the low-frequency magnetic field transmit coils Ltx1 and Ltx2.

The receiver controller 401 obtains relative positions of the low-frequency magnetic field transmit coils Ltx1 and Ltx2 and the low-frequency magnetic field receive coils Lrx1 to Lrx4 based on the obtained amplitudes of the induced signals respectively corresponding to the low-frequency magnetic field transmit coils Ltx1 and Ltx2 and the size information respectively corresponding to the low-frequency magnetic field transmit coils Ltx1 and Ltx2. and then determines the relative positions of the power receive coil and the power transmit coil based on relative positions of the low-frequency magnetic field transmit coils Ltx1 and Ltx2 and the power transmit coil and relative positions of the low-frequency magnetic field receive coils Lrx1 to Lrx4 and the power receive coil in the parameters.

The relative positions of the low-frequency magnetic field receive coils Lrx1 to Lrx4 and the power receive coil are predetermined and stored in the storage unit of the receiver controller 401 or stored in another memory of the receiver, to be invoked when the relative positions need to be used.

In some embodiments, the transmitter further includes a transmitter capacitor, and each low-frequency magnetic field transmit coil is connected in series to one transmitter capacitor. Still referring to FIG. 7, transmitter capacitors Ctx1 and Ctx2 are respectively connected in series to the low-frequency magnetic field transmit coils Ltx1 and Ltx2.

The transmitter capacitor Ctx1 and the low-frequency magnetic field transmit coil Ltx1 form a series resonant circuit, to enhance a transmitted low-frequency magnetic field. In this case, the transmitter controller 301 controls working statuses of the switching transistors Q1 and Q2 of the half-bridge inverter circuit, to convert direct current into alternating current whose frequency is the same as a series resonance frequency of Ctx1 and Ltx1.

The transmitter capacitor Ctx2 and the low-frequency magnetic field transmit coil Ltx2 form a series resonant circuit, to enhance a transmitted low-frequency magnetic field. In this case, the transmitter controller 301 controls working statuses of the switching transistors Q3 and Q4 of the half-bridge inverter circuit, to convert direct current into alternating current whose frequency is the same as a series resonance frequency of Ctx2 and Ltx2.

Correspondingly, the receiver further includes a receiver capacitor, and each low-frequency magnetic field receive coil is connected in parallel to one receiver capacitor. Still referring to FIG. 7, receiver capacitors Crx1 to Crx4 are respectively connected in parallel to the low-frequency magnetic field receive coils Lrx1 to Lrx2. Each receiver capacitor and a corresponding low-frequency magnetic field receive coil connected in parallel form a parallel resonant circuit, and a parallel resonance frequency is the same as the series resonance frequency of the low-frequency magnetic field transmit coil and the transmitter capacitor. so that a low-frequency magnetic field receiving capability of the low-frequency magnetic field receive coil can be enhanced, and a magnetic field receiving distance of the low-frequency magnetic field receive coil is increased.

To sum up, according to the solution provided in this embodiment of this application, the receiver controller allocates the signal pulse width different from that of the currently obtained induced signal to each low-frequency magnetic field transmit coil when both the low-frequency magnetic field transmit coils of the transmitter stop working, that is, the signal pulse width allocated to the low-frequency magnetic field transmit coil is different from that of the interfering signal. The receiver controller further sends the correspondence between each low-frequency magnetic field transmit coil and the allocated signal pulse width to the wireless charging transmitter. The transmitter controller receives the correspondence, and controls the inverter circuit based on the correspondence so that each low-frequency magnetic field transmit coil works. In this case, the receiver controller can determine the relative positions of the power transmit coil and the power receive coil by using the induced signal having the allocated signal pulse width, and the induced signal without the allocated signal pulse width is the interfering signal and is not used to determine the relative positions. Therefore, interference between low-frequency magnetic field signals of adjacent parking spaces can be avoided, so that the obtained relative positions of the power transmit coil and the power receive coil are more accurate.

The following describes working principles of a receiver and a transmitter when a signal feature is a signal code.

Apparatus Embodiment 3

Still referring to FIG. 7, this embodiment of this application may be implemented based on a hardware apparatus the same as that in Embodiment 2. For descriptions of the hardware apparatus, refer to Embodiment 2. Details are not described herein again in this embodiment of this application. A difference lies in a process of controlling and identifying a signal feature, and the difference is specifically described below.

A signal feature in this embodiment of this application is a signal code. A magnetic field signal transmitted by a low-frequency magnetic field transmit coil is controlled, so that the magnetic field signal can be represented by a code. The following provides descriptions by using an example in which a used signal encoding manner is binary encoding. In actual application, another signal encoding manner, for example, quaternary encoding or octal encoding, may be alternatively used. Principles thereof are similar, and details are not described in this embodiment of this application.

When the signal encoding manner is binary encoding, a magnetic field signal transmitted by a low-frequency magnetic field transmit coil may be represented by a different binary numeral.

When the second response information sent by the transmitter is received, the receiver controller 401 learns that both the low-frequency magnetic field transmit coils of the corresponding transmitter stop transmitting low-frequency magnetic fields. In this case, a magnetic field signal received by the low-frequency magnetic field receive coils Lrx1 to Lrx4 of the receiver is an interfering magnetic field transmitted by another transmitter, and therefore an induced signal obtained through conversion is an interfering signal. The detection circuit 402 detects a signal code of the interfering signal, and sends the signal code to the receiver controller 401.

The receiver controller 401 obtains the signal code of the current interfering signal, and allocates a different signal pulse width to each low-frequency magnetic field transmit coil. In some embodiments, the receiver controller 401 may obtain signal codes of a plurality of different interfering signals. For example, the signal codes may be 001 and 010.

To distinguish from the interfering signals, each of signal codes allocated by the receiver controller 401 to the low-frequency magnetic field transmit coils Ltx1 and Ltx2 needs to be different from 001 and 010. For example, the allocated signal codes may be 101 and 111, respectively. It can be understood that the signal codes allocated by the receiver controller 401 to the low-frequency magnetic field transmit coils Ltx1 and Ltx2 may be the same or may be different. This is not specifically limited in this embodiment of this application. The following provides descriptions by using an example in which the allocated signal codes are different.

In some embodiments, alternatively, there may be no interfering magnetic field. In this case, the receiver controller obtains no signal feature of an interfering signal, and a signal code allocated by the receiver controller to each low-frequency magnetic field transmit coil 303 is a preset signal code.

The induced signal may be an induced voltage or an induced current. This is not specifically limited in this embodiment of this application.

Then, the receiver controller 401 sends a second instruction to the transmitter. The second instruction includes a correspondence between each low-frequency magnetic field transmit coil and the allocated signal code. Still referring to the foregoing example, the second instruction can inform the transmitter that the signal code allocated to the low-frequency magnetic field transmit coil Ltx1 is 101 and the signal code allocated to the low-frequency magnetic field transmit coil Ltx2 is 111. The second instruction is further used to request the transmitter to control the low-frequency magnetic field transmit coils to start transmitting low-frequency magnetic fields.

The transmitter may use 1 and 0) for representation based on whether the low-frequency magnetic field transmit coil transmits a low-frequency magnetic field. The transmitter controller 301 controls the low-frequency magnetic field transmit coil to stop for a preset time after transmitting each low-frequency magnetic field corresponding to one binary digit and then transmit a low-frequency magnetic field corresponding to a next binary digit. The following provides descriptions with reference to FIG. 7.

The transmitter controller 301 may control on/off states of the switching transistors Q1 and Q2 in the inverter circuit 302, so that the low-frequency magnetic field transmit coil Ltx1 transmits a low-frequency magnetic field within preset duration, in which case a corresponding code digit is 1: then control the switching transistors Q1 and Q2 to be off for a preset time, and then control the switching transistors Q1 and Q2 to be off, so that the low-frequency magnetic field transmit coil Ltx1 stops transmitting a low-frequency magnetic field within a preset interruption time, in which case a corresponding code digit is 0; and then control the switching transistors Q1 and Q2 to be off for the preset time again, and then control the on/off states of the switching transistors Q1 and Q2, so that the low-frequency magnetic field transmit coil Ltx1 transmits a low-frequency magnetic field within the preset duration, in which case a corresponding code digit is 1. In this way, the low-frequency magnetic fields corresponding to the signal code 101 are transmitted.

The low-frequency magnetic field receive coils Lrx1 to Lrx4 of the receiver can generate induced signals having the allocated signal codes. The detection circuit 402 obtains the signal code based on duration of the induced signal or an interruption time of the induced signal, that is, obtains a signal feature of the induced signal.

After the low-frequency magnetic field transmit coil Ltx1 completes transmitting the low-frequency magnetic fields corresponding to the signal code 101, the transmitter controller 301 controls the low-frequency magnetic field transmit coil Ltx1 to stop transmitting a low-frequency magnetic field. Then, the transmitter controller 301 controls on/off states of the switching transistors Q3 and Q4 in the inverter circuit 302, so that the low-frequency magnetic field transmit coil Ltx2 transmits, by using a method similar to the foregoing method, low-frequency magnetic fields corresponding to the signal code 111. Details are not described herein again in this embodiment of this application.

The receiver controller 401 obtains the signal codes of the induced signals of the low-frequency magnetic field receive coils Lrx1 to Lrx4 by using the detection circuit 402. In this case, the induced signals may still include an interfering signal, but the receiver controller 401 can determine, based on the signal code, whether the induced signal is an interfering signal. To be specific, the receiver controller 401 determines that an induced signal whose signal code is neither 101 nor 111 is an interfering signal, and then determines, based on the correspondence between the allocated signal code and the low-frequency magnetic field transmit coil, the low-frequency magnetic field transmit coils sending the low-frequency magnetic fields that generate the induced signals whose signal codes are 101 and 111, that is, determines that the signal code 101 corresponds to the low-frequency magnetic field transmit coil Ltx1 and the signal code 111 corresponds to the low-frequency magnetic field transmit coil Ltx2.

Then, the receiver controller 401 obtains, from the detection circuit 402, amplitudes of the induced signals respectively corresponding to the low-frequency magnetic field transmit coils Ltx1 and Ltx2.

The receiver controller 401 obtains relative positions of the low-frequency magnetic field transmit coils Ltx1 and Ltx2 and the low-frequency magnetic field receive coils Lrx1 to Lrx4 based on the obtained amplitudes of the induced signals respectively corresponding to the low-frequency magnetic field transmit coils Ltx1 and Ltx2 and the size information respectively corresponding to the low-frequency magnetic field transmit coils Ltx1 and Ltx2, and then determines the relative positions of the power receive coil and the power transmit coil based on relative positions of the low-frequency magnetic field transmit coils Ltx1 and Ltx2 and the power transmit coil and relative positions of the low-frequency magnetic field receive coils Lrx1 to Lrx4 and the power receive coil in the parameters.

The relative positions of the low-frequency magnetic field receive coils Lrx1 to Lrx4 and the power receive coil are predetermined and stored in the storage unit of the receiver controller 401 or stored in another memory of the receiver, to be invoked when the relative positions need to be used.

To sum up, according to the solution provided in this embodiment of this application, the receiver controller allocates the signal code different from that of the currently obtained induced signal to each low-frequency magnetic field transmit coil when both the low-frequency magnetic field transmit coils of the transmitter stop working, that is, the signal code allocated to the low-frequency magnetic field transmit coil is different from that of the interfering signal. The receiver controller further sends the correspondence between each low-frequency magnetic field transmit coil and the allocated signal code to the wireless charging transmitter. The transmitter controller receives the correspondence, and controls the inverter circuit based on the correspondence so that each low-frequency magnetic field transmit coil works. In this case, the receiver controller can determine the relative positions of the power transmit coil and the power receive coil by using the induced signal having the allocated signal code, and the induced signal without the allocated signal code is the interfering signal and is not used to determine the relative positions. Therefore, interference between low-frequency magnetic field signals of adjacent parking spaces can be avoided, so that the obtained relative positions of the power transmit coil and the power receive coil are more accurate.

The following describes working principles of a receiver and a transmitter when a signal feature is a signal frequency.

Apparatus Embodiment 4

Figure 8:
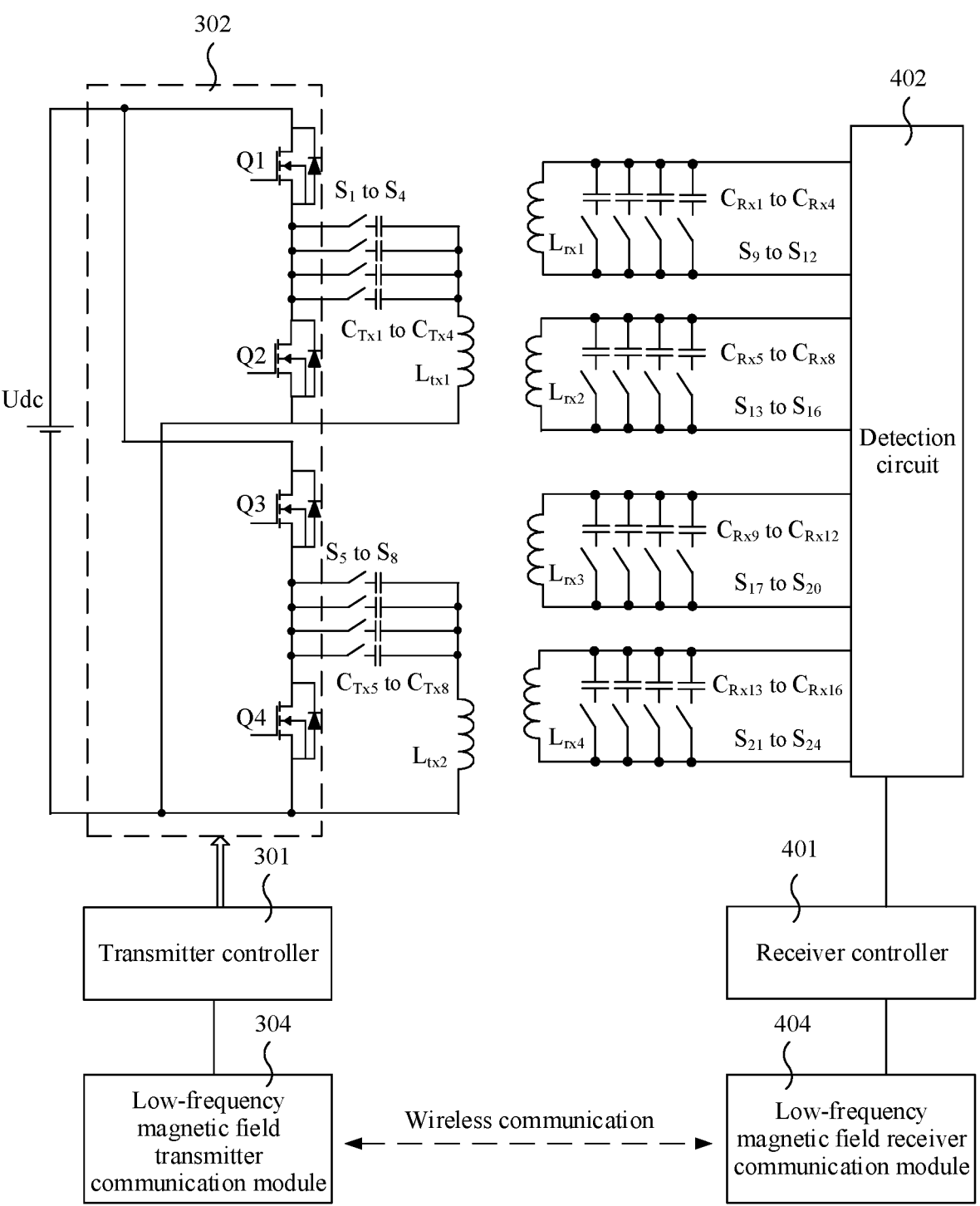
FIG. 8 is a schematic diagram of another wireless charging system according to an embodiment of this application.

FIG. 8 is a schematic diagram of another wireless charging system according to this embodiment of this application.

A difference between a hardware apparatus of the wireless charging system provided in this embodiment of this application and that of the wireless charging system shown in FIG. 7 lies in the following:

Each low-frequency magnetic field receive coil is connected in series to one frequency adjustment circuit, where each frequency adjustment circuit includes at least two frequency adjustment branches connected in parallel, and each frequency adjustment branch includes a transmitter capacitor and a switch that are connected in series. In the figure, an example in which a frequency adjustment circuit connected in series to each of low-frequency magnetic field transmit coils Ltx1 and Ltx2 includes four frequency adjustment branches is used for description. Switches S1 to S8 are correspondingly connected in series to CTx1 to CTx8, respectively.

Each low-frequency magnetic field receive coil of a receiver is connected in parallel to at least two frequency adjustment branches, where each frequency adjustment branch includes a receiver capacitor and a switch that are connected in series. In the figure, an example in which each low-frequency magnetic field receive coil is connected in parallel to four frequency adjustment branches is used for description. Switches S9 to S24 are correspondingly connected in series to CRx1 to CRx8, respectively.

A quantity of frequency adjustment branches included in the frequency adjustment circuit of each low-frequency magnetic field transmit coil may be the same as or different from a quantity of frequency adjustment branches connected in parallel to each low-frequency magnetic field receive coil. This is not specifically limited in this embodiment of this application. However, the following condition needs to be met: An on/off state of the switch is adjusted so that a parallel resonance frequency of a parallel resonant circuit formed by the low-frequency magnetic field transmit coil of the receiver and the connected receiver capacitor is the same as a resonance frequency of a series resonant circuit formed by the low-frequency magnetic field transmit coil of a transmitter and the connected transmitter capacitor.

The following describes a principle of obtaining relative positions of a power transmit coil and a power receive coil by using a signal frequency.

Some information exchange processes of a receiver controller 401 and a transmitter controller 301 are similar, and details are not described herein again in this embodiment of this application.

When second response information sent by the transmitter is received, the receiver controller 401 learns that both the low-frequency magnetic field transmit coils of the corresponding transmitter stop transmitting low-frequency magnetic fields. In this case, a magnetic field signal received by low-frequency magnetic field receive coils Lrx1 to Lrx4 of the receiver is an interfering magnetic field transmitted by another transmitter, and therefore an induced signal obtained through conversion is an interfering signal. A detection circuit 402 detects a signal frequency of the interfering signal, and sends the signal frequency to the receiver controller 401.

The receiver controller 401 obtains the signal frequency of the current interfering signal, and allocates a different signal frequency to each low-frequency magnetic field transmit coil. It can be understood that signal frequencies allocated by the receiver controller 401 to the low-frequency magnetic field transmit coils Ltx1 and Ltx2 may be the same or may be different. This is not specifically limited in this embodiment of this application. The following provides descriptions by using an example in which a first frequency is allocated to the low-frequency magnetic field transmit coil Ltx1 and a second frequency is allocated to the low-frequency magnetic field transmit coil Ltx2.

In some embodiments, alternatively, there may be no interfering magnetic field. In this case, the receiver controller obtains no signal frequency of an interfering signal, and a signal frequency allocated by the receiver controller to each low-frequency magnetic field transmit coil 303 is a preset signal frequency, that is, a first frequency and second frequency allocated in this case are preset signal frequencies.

The induced signal may be an induced voltage or an induced current. This is not specifically limited in this embodiment of this application.

Then, the receiver controller 401 sends a second instruction to the transmitter. The second instruction includes a correspondence between each low-frequency magnetic field transmit coil and the allocated signal frequency. In other words, the second instruction can inform the transmitter that the signal frequency allocated to the low-frequency magnetic field transmit coil Ltx1 is the first frequency and the signal frequency allocated to the low-frequency magnetic field transmit coil Ltx2 is the second frequency. The second instruction is further used to request the transmitter to control the low-frequency magnetic field transmit coils to start transmitting low-frequency magnetic fields.

The transmitter controller 301 controls a working status of the switch in each frequency adjustment branch based on the correspondence, so that a series resonance frequency of the low-frequency magnetic field transmit coil and the connected transmitter capacitor is the same as the signal frequency allocated to the low-frequency magnetic field transmit coil.

The transmitter controller 301 adjusts a duty cycle and/or a frequency of a control signal of a switching transistor in an inverter circuit 302, so that each low-frequency magnetic field transmit coil transmits a low-frequency magnetic field.

In this case, when the signal frequencies allocated to the low-frequency magnetic field transmit coils are the same, the low-frequency magnetic field transmit coils may transmit low-frequency magnetic fields at different times; or when the signal frequencies allocated to the low-frequency magnetic field transmit coils are different, the low-frequency magnetic field transmit coils may transmit low-frequency magnetic fields at the same time, or may transmit low-frequency magnetic fields at different times.

The receiver controller 401 controls a working status of the switch in each frequency adjustment branch of the receiver, so that a parallel resonance frequency of the low-frequency magnetic field receive coil and the connected receiver capacitor is the same as the allocated signal frequency, thereby enhancing a low-frequency magnetic field receiving capability of the receive coil.

Types of the switches in the frequency adjustment branches of the transmitter and the receiver may be the same as or different from a type of a switch in the inverter circuit 302. This is not specifically limited in this embodiment of this application.

To sum up, when both the low-frequency magnetic field transmit coils of the wireless charging transmitter stop working, a low-frequency magnetic field received by the low-frequency magnetic field receive coil is an interfering magnetic field, and an induced signal obtained through conversion is an interfering signal. The receiver controller allocates the signal frequency different from that of the currently obtained induced signal to each low-frequency magnetic field transmit coil. In other words, the signal frequency allocated to the low-frequency magnetic field transmit coil is different from that of the interfering signal. The receiver controller further sends the correspondence between each low-frequency magnetic field transmit coil and the allocated signal frequency to the wireless charging transmitter. The transmitter controller receives the correspondence, and controls the inverter circuit based on the correspondence so that each low-frequency magnetic field transmit coil works. In this case, the receiver controller can determine the relative positions of the power transmit coil and the power receive coil by using the induced signal having the allocated signal frequency, and the induced signal without the allocated signal frequency is the interfering signal and is not used to determine the relative positions. Therefore, interference between low-frequency magnetic field signals of adjacent parking spaces can be avoided, so that the obtained relative positions of the power transmit coil and the power receive coil are more accurate.

Method Embodiments

Based on the wireless charging transmitter and the wireless charging receiver provided in the foregoing embodiments, the embodiments of this application further provide a wireless charging control method for guiding alignment of a power transmit coil and a power receive coil. The following provides specific descriptions with reference to accompanying drawings.

FIG. 9 is a flowchart of a wireless charging control method according to an embodiment of this application.

The method is applied to a wireless charging receiver, and includes the following steps:

S901: Allocate, when all low-frequency magnetic field transmit coils stop working, a signal feature different from that of a currently obtained induced signal to each low-frequency magnetic field transmit coil, and send a correspondence between each low-frequency magnetic field transmit coil and the allocated signal feature to a wireless charging transmitter.

S902: Determine, when the low-frequency magnetic field transmit coil works, relative positions of a power transmit coil and a power receive coil by using an induced signal having the allocated signal feature.

FIG. 10 is a flowchart of another wireless charging control method according to an embodiment of this application.

The method is applied to a wireless charging transmitter, and includes the following steps:

S1001: Receive a correspondence, sent by a wireless charging receiver, between each low-frequency magnetic field transmit coil and an allocated signal feature.

S1002: Control an inverter circuit based on the correspondence to enable each low-frequency magnetic field transmit coil to work, where the allocated signal feature is a signal feature that is allocated by the receiver to each low-frequency magnetic field transmit coil when all low-frequency magnetic field transmit coils stop working and that is different from that of a currently obtained induced signal.

The following describes the foregoing control methods with reference to specific implementations of a receiver and a transmitter.

FIG. 11A and FIG. 11B are a flowchart of still another wireless charging control method according to an embodiment of this application.

The method shown in the figure includes the following steps:

S1101: A receiver sends an alignment guiding request to a transmitter, where the alignment guiding request is used to request the transmitter to guide alignment.

S1102: The transmitter receives the alignment guiding request and sends first response information to the receiver, where the first response information includes parameters of all the low-frequency magnetic field transmit coils.

The parameters include identification information of the low-frequency magnetic field transmit coil, size information, and relative position information of the low-frequency magnetic field transmit coil and a power transmit coil. The identification information is used to distinguish between different low-frequency magnetic field transmit coils. The size information is used to determine relative positions of the low-frequency magnetic field transmit coil and a low-frequency magnetic field receive coil. The relative position information needs to be used when converting the relative positions of the low-frequency magnetic field transmit coil and the low-frequency magnetic field receive coil into relative positions of the power transmit coil and a power receive coil.

S1103: The receiver receives the first response information sent by the transmitter.

S1104: The receiver sends a first instruction to the transmitter, where the first instruction is used to instruct the transmitter to control all the low-frequency magnetic field transmit coils to stop working.

S1105: The transmitter receives the first instruction, controls all the low-frequency magnetic field transmit coils to stop working, and sends second response information to the receiver, where the second response information is used to indicate, to the receiver, that all the low-frequency magnetic field transmit coils have stopped working.

S1106: When receiving the second response information, the receiver allocates a signal feature different from that of a currently obtained induced signal to each low-frequency magnetic field transmit coil, or allocates a preset signal feature to each low-frequency magnetic field transmit coil when no signal feature of the induced signal is obtained currently.

The signal feature may be one of a signal pulse width, a signal code, and a signal frequency.

When the signal feature is the signal pulse width, pulse duration of the induced signal may be detected to obtain the signal pulse width of the induced signal.

When the signal feature is the signal code, the signal code may be obtained based on duration of the induced signal or an interruption time of the induced signal.

When the signal feature is the signal frequency; a frequency of the induced signal is the signal frequency.

When the signal feature is the signal frequency, each low-frequency magnetic field receive coil is connected in parallel to at least two frequency adjustment branches, where each frequency adjustment branch includes a receiver capacitor and a switch that are connected in series.

A receiver controller controls a working status of the switch in each frequency adjustment branch, so that a parallel resonance frequency of the low-frequency magnetic field receive coil and the connected receiver capacitor is the same as the allocated signal frequency.

When all the low-frequency magnetic field transmit coils of the wireless charging transmitter stop working, a low-frequency magnetic field received by the low-frequency magnetic field receive coil is an interfering magnetic field, and an induced signal obtained through conversion is an interfering signal. The receiver controller allocates the signal feature different from that of the currently obtained induced signal to each low-frequency magnetic field transmit coil. In other words, the signal feature allocated to the low-frequency magnetic field transmit coil is different from that of the interfering signal.

S1107: The receiver sends a second instruction that includes a correspondence between each low-frequency magnetic field transmit coil and the allocated signal feature to the transmitter, where the second instruction is further used to request the transmitter to control the low-frequency magnetic field transmit coil to start working.

S1108: The transmitter receives the second instruction and controls the low-frequency magnetic field transmit coil to start working.

When the signal feature is the signal pulse width, a duty cycle and/or a frequency of a control signal of a switching transistor of an inverter circuit are/is adjusted based on the correspondence, so that the low-frequency magnetic field transmit coils transmit low-frequency magnetic fields at different times. The low-frequency magnetic field is used to make each low-frequency magnetic field receive coil generate an induced signal having the allocated signal pulse width.

When the signal feature is the signal code, a control signal of a switching transistor in an inverter circuit is adjusted based on the correspondence, so that the low-frequency magnetic field transmit coil transmits a low-frequency magnetic field based on preset duration or stops working based on a preset interruption time.

A signal encoding manner is binary encoding. A transmitter controller may control the low-frequency magnetic field transmit coil to stop for a preset time after transmitting each low-frequency magnetic field corresponding to one binary digit and then transmit a low-frequency magnetic field corresponding to a next binary digit.

When the signal feature is the signal frequency; each low-frequency magnetic field transmit coil is connected in series to one frequency adjustment circuit, where each frequency adjustment circuit includes at least two frequency adjustment branches connected in parallel, and each frequency adjustment branch includes a transmitter capacitor and a switch that are connected in series. The transmitter controller controls a working status of the switch in each frequency adjustment branch based on the correspondence, so that a series resonance frequency of the low-frequency magnetic field transmit coil and the connected transmitter capacitor is the same as the signal frequency allocated to the low-frequency magnetic field transmit coil. In addition, the transmitter controller adjusts the duty cycle and/or the frequency of the control signal of the switching transistor in the inverter circuit, so that each low-frequency magnetic field transmit coil transmits the low-frequency magnetic field.

In this case, when signal frequencies allocated to the low-frequency magnetic field transmit coils are the same, the low-frequency magnetic field transmit coils may transmit low-frequency magnetic fields at different times: or when signal frequencies allocated to the low-frequency magnetic field transmit coils are different, the low-frequency magnetic field transmit coils may transmit low-frequency magnetic fields at the same time, or may transmit low-frequency magnetic fields at different times.

S1109: The receiver determines, based on the correspondence, the signal feature and an amplitude that correspond to each low-frequency magnetic field transmit coil; and obtains the relative positions of the power transmit coil and the power receive coil based on the signal feature and the amplitude that correspond to each low-frequency magnetic field transmit coil, relative positions of each low-frequency magnetic field receive coil and the power receive coil, and the parameters.

It can be understood that the division and sequence of the foregoing steps are merely intended for ease of describing a principle of this solution, and do not constitute a limitation on this application.

To sum up, according to the method provided in this embodiment of this application, the signal feature different from that of the currently obtained induced signal is allocated to each low-frequency magnetic field transmit coil when all the low-frequency magnetic field transmit coils of the wireless charging transmitter stop working, that is, the signal feature allocated to the low-frequency magnetic field transmit coil is different from that of the interfering signal. In addition, the correspondence between each low-frequency magnetic field transmit coil and the allocated signal feature is sent to the wireless charging transmitter. The transmitter receives the correspondence, and controls the inverter circuit based on the correspondence so that each low-frequency magnetic field transmit coil works. In this case, the receiver can determine the relative positions of the power transmit coil and the power receive coil by using the induced signal having the allocated signal feature, and the induced signal without the allocated signal feature is the interfering signal and is not used to determine the relative positions. Therefore, interference between low-frequency magnetic field signals of adjacent parking spaces can be avoided, so that the obtained relative positions of the power transmit coil and the power receive coil are more accurate.

Wireless Charging System Embodiment

Based on the wireless charging transmitter and the wireless charging receiver provided in the foregoing embodiments, this embodiment of this application further provides a wireless charging system. The following provides specific descriptions with reference to an accompanying drawing.

Figure 12:
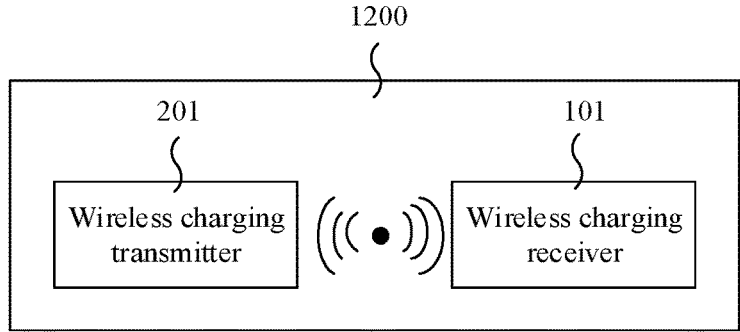
FIG. 12 is a schematic diagram of a wireless charging system according to an embodiment of this application.

FIG. 12 is a schematic diagram of the wireless charging system according to this embodiment of this application.

The wireless charging system 1200 includes a wireless charging transmitter 201 and a wireless charging receiver 101.

The wireless charging receiver 101 includes a receiver controller, a power receive coil, and a low-frequency magnetic field receive coil.

The wireless charging transmitter 201 includes an inverter circuit, a transmitter controller, a power transmit coil, and a low-frequency magnetic field transmit coil.

For specific implementations and working principles of the wireless charging receiver 101 and the wireless charging transmitter 201, refer to related descriptions of the foregoing apparatus embodiments and method embodiments. Details are not described herein again in this embodiment of this application.

With the wireless charging system provided in this embodiment of this application, when all low-frequency magnetic field transmit coils of the wireless charging transmitter stop working, a low-frequency magnetic field received by the low-frequency magnetic field receive coil is an interfering magnetic field, and an induced signal obtained through conversion is an interfering signal. The receiver controller allocates a signal feature different from that of the currently obtained induced signal to each low-frequency magnetic field transmit coil. In other words, the signal feature allocated to the low-frequency magnetic field transmit coil is different from that of the interfering signal. The receiver controller further sends a correspondence between each low-frequency magnetic field transmit coil and the allocated signal feature to the wireless charging transmitter.

The transmitter controller receives the correspondence, and controls the inverter circuit based on the correspondence so that each low-frequency magnetic field transmit coil works. In this case, the receiver controller can determine relative positions of the power transmit coil and the power receive coil by using an induced signal having the allocated signal feature, and the induced signal without the allocated signal feature is the interfering signal and is not used to determine the relative positions. Therefore, interference between low-frequency magnetic field signals of adjacent parking spaces can be avoided, so that the obtained relative positions of the power transmit coil and the power receive coil are more accurate.

Electric Vehicle Embodiment

Based on the wireless charging receiver provided in the foregoing embodiments, this embodiment of this application further provides an electric vehicle having a wireless charging function. The following provides specific descriptions with reference to an accompanying drawing.

Figure 13:
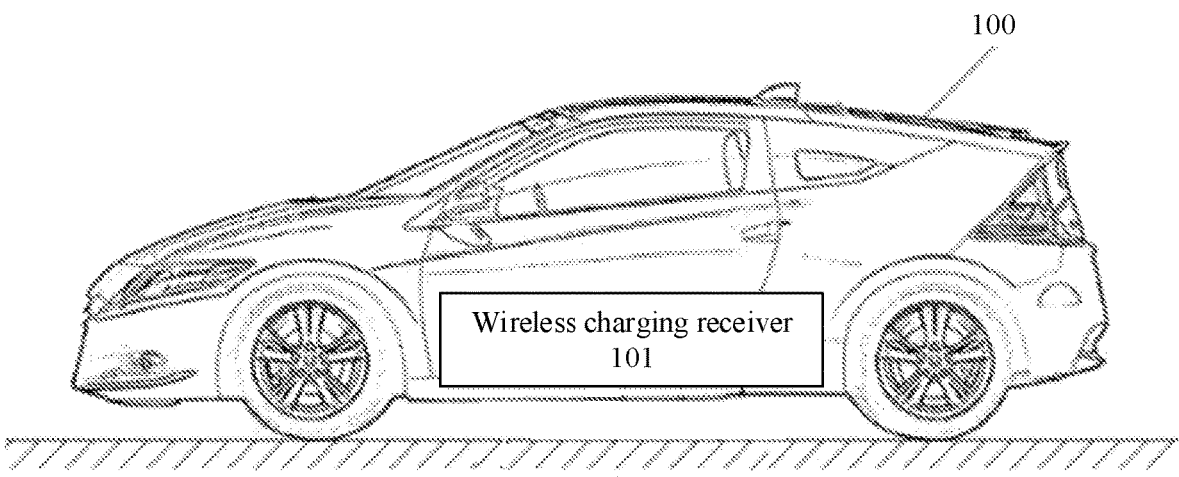
FIG. 13 is a schematic diagram of an electric vehicle according to an embodiment of this application.

FIG. 13 is a schematic diagram of the electric vehicle according to this embodiment of this application.

The electric vehicle 100 includes a wireless charging receiver 101, a power battery pack, and a display screen (not shown in the figure).

The wireless charging receiver 101 is configured to charge power batteries of the electric vehicle. For an implementation and a working principle of the wireless charging receiver 101, refer to related descriptions in the foregoing embodiments. Details are not described herein again in this embodiment of this application.

The power battery pack is configured to electrically connect to the receiver for charging by using electric energy from the receiver, and is also configured to provide electric energy for the electric vehicle.

The display screen is configured to display relative positions of a power transmit coil and a power receive coil, so as to guide a driver in aligning the power transmit coil and the power receive coil during parking.

The wireless charging receiver 101 of the electric vehicle includes a receiver controller. The receiver controller can allocate a signal feature different from that of a currently obtained induced signal to each low-frequency magnetic field transmit coil when all low-frequency magnetic field transmit coils of a wireless charging transmitter stop working. that is, the signal feature allocated to the low-frequency magnetic field transmit coil is different from that of the interfering signal. The receiver controller further sends a correspondence between each low-frequency magnetic field transmit coil and the allocated signal feature to the wireless charging transmitter, so that a transmitter controller receives the correspondence, and controls an inverter circuit based on the correspondence so that each low-frequency magnetic field transmit coil works. In this case, the receiver controller can determine the relative positions of the power transmit coil and the power receive coil by using an induced signal having the allocated signal feature, and the induced signal without the allocated signal feature is the interfering signal and is not used to determine the relative positions. Therefore, interference from a low-frequency magnetic field signal of an adjacent parking space can be avoided during parking of the electric vehicle, so that the power transmit coil and the power receive coil can be aligned more accurately, thereby increasing charging power and charging efficiency of the electric vehicle during wireless charging.

It should be understood that, in this application, "at least one (item)" means one or more, and "a plurality of" means two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

Embodiments in this specification are all described in a progressive manner, for same or similar parts in embodiments, refer to these embodiments, and each embodiment focuses on a difference from other embodiments. Especially, an apparatus embodiment is basically similar to a method embodiment, and therefore is described briefly; for related parts, refer to partial descriptions in the method embodiment. The apparatus embodiments described above are merely examples, where the units and modules described as separate components may or may not be physically separate. Some or all the modules may be selected based on an actual requirement to achieve the objectives of the solutions of the embodiments. A person of ordinary skill in the art may understand and implement embodiments without creative efforts.

The foregoing descriptions are merely specific implementations of this application. It should be noted that a person of ordinary skill in the art may make several improvements or polishing without departing from the principle of this application and the improvements or polishing shall fall within the protection scope of this application.

What is claimed is:

1. A wireless charging receiver comprising:
   a power receive coil configured to convert an alternating magnetic field transmitted by a power transmit coil at a wireless charging transmitter into alternating current:
   a low-frequency magnetic field receive coil configured to convert a low-frequency magnetic field, transmitted by low-frequency magnetic field transmit coils, into a first induced signal for use in measuring alignment of the power receive coil and the power transmit coil:
   a receiver controller configured to:
   instruct the wireless charging transmitter to stop transmission of the low-frequency magnetic field based on information derived from the first induced signal being inadequate to determine relative positions of the power receive coil and the power transmit coil,
   receive information from the wireless charging transmitter indicating the low-frequency magnetic field transmit coils have stopped working,
   update allocation of signal features for the low-frequency magnetic field transmit coils,
      wherein each low-frequency transmit coil is assigned a signal feature different from other low-frequency magnetic field transmit coils,
      send the updated allocation to the wireless charging transmitter, and
      determine, based on the low-frequency magnetic field transmit coils using the updated allocation, the relative positions of the power transmit coil and the power receive coil by using a second induced signal based on the signal features allocated to the low-frequency magnetic field transmit coils.

2. The wireless charging receiver according to claim 1, wherein the updated allocation of signal features is a preset allocation based on the low-frequency magnetic field transmit coils having stopped working and no signal feature from the first induced signal is obtained.

3. The wireless charging receiver according to claim 1, wherein the receiver controller is further configured to:
   send an alignment guiding request to the wireless charging transmitter, wherein the alignment guiding request is used to request the wireless charging transmitter to guide alignment; and
   receive first response information sent by the wireless charging transmitter, wherein the first response information comprises parameters of the low-frequency magnetic field transmit coils.

4. The wireless charging receiver according to claim 1, wherein the updated allocation is further used to request the wireless charging transmitter control the low-frequency magnetic field transmit coils to start working using the updated allocation.

5. The wireless charging receiver according to claim 3, wherein the parameters comprise identification information of the low-frequency magnetic field transmit coils, size information, and relative position information of the low-frequency magnetic field transmit coils and the power transmit coil.

6. The wireless charging receiver according to claim 1, wherein a signal feature among the signal features is one of the following: a signal pulse width, a signal code, and a signal frequency, and wherein the wireless charging receiver further includes:
   a receiver capacitor connected in parallel with the low-frequency magnetic field receive coil to form a pair, wherein the pair form a parallel resonant circuit, and wherein a parallel resonance frequency of the pair is the same as a series resonance frequency of a pair comprising one of the low-frequency magnetic field transmit coils and a transmitter capacitor of a wireless transmitter.

7. The wireless charging receiver according to claim 6, further comprising a detection circuit
   wherein an input terminal of the detection circuit is connected to the low-frequency magnetic field receive coil, and an output terminal of the detection circuit is connected to the receiver controller; and
   wherein the detection circuit is configured to obtain an amplitude of the induced signal and the signal feature of the induced signal and send the amplitude and the signal feature to the receiver controller.

8. A wireless charging transmitter comprising an inverter circuit, a transmitter controller, a power transmit coil and a low-frequency magnetic field transmit coils, wherein the power transmit coil is configured to transmit alternating current in a form of an alternating magnetic field:

the inverter circuit is configured to convert direct current into alternating current and to supply the alternating current to the low-frequency magnetic field transmit coils:

the low-frequency magnetic field transmit coils are configured to transmit the alternating current in a form of a low-frequency magnetic field:

the transmitter controller is configured to:

receive, a correspondence, from a wireless charging receiver, between each low-frequency magnetic field transmit coil and an allocated signal feature and an instruction to stop transmission;

control the inverter circuit to stop operation of the low-frequency magnetic field transmit coils in response to the instruction;

receive, from the wireless charging receiver after the low-frequency magnetic field transmit coils have stopped working, an updated allocation of signal features to the low-frequency magnetic field transmit coils, wherein each low-frequency magnetic field transmit coil is assigned a signal feature different from signal features assigned to other low-frequency magnetic field transmit coils; and control the inverter circuit to operate the low-frequency magnetic field transmit coils using the updated allocation of signal features such that induced signals generated at the wireless charging receiver are distinguishable for determining relative positions of the power transmit coil and a power receive coil.

9. The wireless charging transmitter according to claim 8, wherein the signal feature is one of the following: a signal pulse width, a signal code and a signal frequency.

10. The wireless charging transmitter according to claim 9, further comprising: a transmitter capacitor:

wherein each low-frequency magnetic field transmit coil is connected in series to one transmitter capacitor; and wherein the transmitter capacitor is configured to form a series resonant circuit jointly with the low-frequency magnetic field transmit ceil coils.

11. The wireless charging transmitter according to claim 10, wherein the signal feature is the signal pulse width, and the transmitter controller is further configured to:

adjust a duty cycle and/or a frequency of a control signal of a switching transistor in the inverter circuit based on the correspondence, so that the low-frequency magnetic field transmit coils transmit low-frequency magnetic fields at different times, wherein the low-frequency magnetic field is used to make each low-frequency magnetic field receive coil generate an induced signal having the allocated signal pulse width.

12. The wireless charging transmitter according to claim 10, wherein the signal feature is the signal code, and the transmitter controller is further configured to:

adjust a control signal of a switching transistor in the inverter circuit based on the correspondence, so that the low-frequency magnetic field transmit coils transmits a low-frequency magnetic field based on preset duration or stops working based on a preset interruption time.

13. The wireless charging transmitter according to claim 9, wherein the signal feature is the signal frequency, and each low-frequency magnetic field transmit coil is connected in series to one frequency adjustment circuit, wherein each frequency adjustment circuit comprises at least two frequency adjustment branches connected in parallel, and each frequency adjustment branch comprises a transmitter capacitor and a switch that are connected in series; and wherein the transmitter controller is further configured to:

control a working status of the switch in each frequency adjustment branch based on the correspondence, so that a series resonance frequency of the low-frequency magnetic field transmit coils and the connected transmitter capacitor is the same as the signal frequency allocated to the low-frequency magnetic field transmit coils; and adjust a duty cycle and/or a frequency of a control signal of a switching transistor in the inverter circuit, so that each low-frequency magnetic field transmit coil transmits the low-frequency magnetic field.

14. A wireless charging control method, applied to a wireless charging receiver comprising a receiver controller, a power receive coil, and a low-frequency magnetic field receive coil, wherein the power receive coil is configured to convert an alternating magnetic field transmitted by a power transmit coil into alternating current, and wherein the low-frequency magnetic field receive coil is configured to convert a low-frequency magnetic field into an induced signal, and the method comprises:

obtaining a first induced signal from the low-frequency magnetic field receive coil:

determining, based on information derived from the first induced signal, that relative positions of the power receive coil and the power transmit coil cannot be determined;

instructing a wireless charging transmitter to stop transmission of the low-frequency magnetic field in response to the determination;

receiving information from the wireless charging transmitter indicating the low-frequency magnetic field transmit coils have stopped working;

updating an allocation of signal features to the low-frequency magnetic field transmit coils, wherein each low-frequency magnetic field transmit coil is assigned a signal feature different from signal features assigned to other low-frequency magnetic field transmit coils;

sending information relating each low-frequency magnetic field transmit coil and its allocated signal feature to the wireless charging transmitter; and determining relative positions of a power transmit coil and a power receive coil by using a second induced signal generated by operation of the low-frequency magnetic field transmit coils using the updated allocation of signal features.

15. The method according to claim 14, further comprising:

based on the low-frequency magnetic field transmit coils having stopped working and no signal feature from the first induced signal is obtained, the signal feature allocated to each low-frequency magnetic field transmit coil is a preset signal feature.

16. The method according to claim 14, wherein the signal feature is one of the following: a signal pulse width, a signal code, and a signal frequency.

17. A wireless charging control method, applied to a wireless charging transmitter comprising an inverter circuit, a transmitter controller, a power transmit coil, and a low-frequency magnetic field transmit coils, wherein the power transmit coil is configured to transmit alternating current in a form of an alternating magnetic field, wherein the inverter circuit is configured to convert direct current into alternating current and to supply the alternating current to the low-frequency magnetic field transmit coil coils, and wherein the low-frequency magnetic field transmit coils are configured to transmit the alternating current in a form of a low-frequency magnetic field, and the method comprises:

receiving, from a wireless charging receiver, an instruction to stop transmission of the low-frequency magnetic field;

controlling an inverter circuit to stop operation of the low-frequency magnetic field transmit coils in response to the instruction, after the low-frequency magnetic field transmit coils have stopped operating, receiving, from the wireless charging receiver, an updated allocation of signal features to the low-frequency magnetic field transmit coils, wherein each low-frequency magnetic field transmit coil is assigned a signal feature different from signal features assigned to other low-frequency magnetic field transmit coils;

controlling the inverter circuit to operate the low-frequency magnetic field transmit coils using the updated allocation of signal features; and transmitting the low-frequency magnetic field using the updated allocation such that induced signals at the wireless charging receiver are distinguishable for determining relative positions of the power transmit coil and a power receive coil.

18. A wireless charging system comprising:

a wireless charging receiver, and a wireless charging transmitter, wherein the wireless charging receiver comprises a receiver controller, a power receive coil, and low-frequency magnetic field receive coils, and wherein the power receive coil is configured to convert an alternating magnetic field transmitted by a power transmit coil into alternating current:

each of the low-frequency magnetic field receive coil is configured to convert a low-frequency magnetic field into an induced signal:

the receiver controller is configured to, based on the low-frequency magnetic field transmit coils having stopped working, allocate a signal feature different from that of a current induced signal to each low-frequency magnetic field transmit coil, and send a correspondence between each low-frequency magnetic field transmit coil and the allocated signal feature to the wireless charging transmitter:

the receiver controller is further configured to determine, based on the low-frequency magnetic field transmit coils working, relative positions of the power transmit coil and the power receive coil by using an induced signal having the allocated signal feature;

wherein the wireless charging transmitter comprises an inverter circuit, a transmitter controller, a power transmit coil, and a low-frequency magnetic field transmit coil, and wherein the power transmit coil is configured to transmit alternating current in a form of an alternating magnetic field;

the inverter circuit is configured to convert direct current into alternating current and then transmit the alternating current to the low-frequency magnetic field transmit coils;

the low-frequency magnetic field transmit coils are configured to transmit the alternating current in a form of a low-frequency magnetic field; and the transmitter controller is configured to receive the correspondence, sent by the wireless charging receiver, between each low-frequency magnetic field transmit coil and an allocated signal feature, and is further configured to control the inverter circuit based on the correspondence to enable each low-frequency magnetic field transmit coil to work, wherein the allocated signal feature is a signal feature that is allocated by a receiver controller to each low-frequency magnetic field transmit coil based on all low-frequency magnetic field transmit coils stop working and that is different from that of a current induced signal.

19. An electric vehicle comprising:

a wireless charging receiver;

a power battery pack configured to electrically connect to the wireless charging receiver for charging by using electric energy from the wireless charging receiver, and to provide electric energy for operation of the electric vehicle;

a power receive coil configured to convert an alternating magnetic field transmitted by a power transmit coil into alternating current:

a low-frequency magnetic field receive coil configured to convert a low-frequency magnetic field, transmitted by low-frequency magnetic field transmit coils, into an induced signal; and a receiver controller configured to:

instruct a wireless charging transmitter to stop transmission of the low-frequency magnetic field based on information derived from the first induced signal being inadequate to determine relative positions of the power receive coil and the power transmit coil;

receive information from the wireless charging transmitter indicating that all of the low-frequency magnetic field transmit coils have stopped working;

update allocation of signal features for the low-frequency magnetic field transmit coils, wherein each low-frequency magnetic field transmit coil is assigned a signal feature different from signal features assigned to other low-frequency magnetic field transmit coils;

send the updated allocation of correspondence between each low-frequency magnetic field transmit coil and the allocated signal feature to the wireless charging transmitter; and determine, based on operation of the low-frequency magnetic field transmit coils using the updated allocation, relative positions of the power transmit coil and the power receive coil by using a second induced signal.

* * * * *